United States Patent
Tengler et al.

(10) Patent No.: US 7,110,964 B2
(45) Date of Patent: Sep. 19, 2006

(54) ORDER PROCESSING

(75) Inventors: Craig D. Tengler, Boxford, MA (US); John F. Cardinal, North Andover, MA (US); Frank Cantwell, Winchester, MA (US); Monica M. Hering, Methuen, MA (US); Stephen P. McDonnell, Pepperell, MA (US); Steven Bigari, Colorado Springs, CO (US)

(73) Assignee: Exit41, Inc., Andover, MA (US)

( * ) Notice: Subject to any disclaimer, the term of this patent is extended or adjusted under 35 U.S.C. 154(b) by 2 days.

(21) Appl. No.: 10/652,702

(22) Filed: Aug. 29, 2003

(65) Prior Publication Data

US 2005/0049940 A1    Mar. 3, 2005

(51) Int. Cl.
*G06G 1/12* (2006.01)

(52) U.S. Cl. ............................ 705/21; 705/15
(58) Field of Classification Search .................. 705/15, 705/16, 17, 18, 19, 20, 21, 22, 26, 27, 28, 705/29, 30; 370/352

See application file for complete search history.

(56) References Cited

U.S. PATENT DOCUMENTS

| | | | |
|---|---|---|---|
| 3,304,416 A | 2/1967 | Wolf | |
| 3,310,797 A | 3/1967 | Auger | |
| 4,128,757 A | 12/1978 | Garner, Jr. | |
| 4,388,689 A | 6/1983 | Hayman et al. | |
| 4,415,065 A | 11/1983 | Sandstedt | |
| 4,530,067 A | 7/1985 | Dorr | |
| 4,553,222 A | 11/1985 | Kurland et al. | |
| 4,567,359 A | 1/1986 | Lockwood | |
| 4,569,421 A | 2/1986 | Sandstedt | |
| 4,722,053 A * | 1/1988 | Dubno et al. ................. | 705/15 |
| 4,797,818 A | 1/1989 | Cotter | |
| 5,003,472 A | 3/1991 | Perrill et al. | |
| 5,128,862 A | 7/1992 | Mueller | |
| 5,198,976 A | 3/1993 | Form et al. | |
| 5,235,509 A | 8/1993 | Mueller et al. | |
| 5,262,938 A * | 11/1993 | Rapoport et al. ............. | 705/15 |
| 5,353,219 A | 10/1994 | Mueller et al. | |
| 5,465,291 A | 11/1995 | Barrus et al. | |
| 5,504,589 A | 4/1996 | Montague et al. | |
| 5,510,979 A | 4/1996 | Moderi et al. | |
| 5,602,730 A | 2/1997 | Coleman et al. | |
| 5,636,710 A | 6/1997 | Ables et al. | |
| 5,664,110 A | 9/1997 | Green et al. | |
| 5,838,798 A | 11/1998 | Stevens, III | |
| 5,845,263 A * | 12/1998 | Camaisa et al. ............. | 705/15 |
| 5,864,824 A | 1/1999 | Iguchi et al. | |

(Continued)

FOREIGN PATENT DOCUMENTS

EP    1 388 797    2/2004

(Continued)

OTHER PUBLICATIONS

Piller, Matt; "Quick Service Technology Is Born Again", Business Solutions, Oct. 2002. http://www.businesssolutionsmag.com/Articles/2002_10/021002.htm.

(Continued)

*Primary Examiner*—Andrew J. Fischer
(74) *Attorney, Agent, or Firm*—Fish & Richardson P.C.

(57) ABSTRACT

In one aspect, orders for goods or services are enabled to be received from electronic devices situated at multiple points at which orders are to be placed, and the orders are received electronically through a communication medium that enables automatic identification of the location at which each of the orders is placed.

28 Claims, 21 Drawing Sheets

U.S. PATENT DOCUMENTS

| | | | |
|---|---|---|---|
| 5,875,430 A | 2/1999 | Koether | |
| 5,907,275 A | 5/1999 | Battistini et al. | |
| 5,912,743 A | 6/1999 | Kinebuchi et al. | |
| 5,918,213 A | 6/1999 | Bernard et al. | |
| 5,969,968 A | 10/1999 | Pentel | |
| 5,991,739 A | 11/1999 | Cupps et al. | |
| 6,003,015 A | 12/1999 | Kang et al. | |
| 6,026,375 A | 2/2000 | Hall et al. | |
| 6,208,976 B1 * | 3/2001 | Kinebuchi et al. | 705/15 |
| 6,317,835 B1 | 11/2001 | Bilger et al. | |
| 6,366,220 B1 | 4/2002 | Elliot | |
| 6,374,240 B1 | 4/2002 | Walker et al. | |
| 6,425,524 B1 | 7/2002 | Pentel | |
| 6,435,406 B1 | 8/2002 | Pentel | |
| 6,473,739 B1 | 10/2002 | Showghi et al. | |
| 6,574,603 B1 | 6/2003 | Dickson et al. | |
| 6,625,580 B1 | 9/2003 | Tayama | |
| 6,636,835 B1 * | 10/2003 | Ragsdale-Elliott et al. | 705/15 |
| 6,722,473 B1 | 4/2004 | Ramachandran et al. | |
| 6,782,091 B1 | 8/2004 | Dunning, III | |
| 6,810,304 B1 | 10/2004 | Dickson | |
| 6,836,476 B1 * | 12/2004 | Dunn et al. | 370/352 |
| 6,847,965 B1 | 1/2005 | Walker et al. | |
| 2002/0013730 A1 | 1/2002 | Bigus | |
| 2002/0095342 A1 | 7/2002 | Feldman et al. | |
| 2002/0138350 A1 | 9/2002 | Cogen | |
| 2002/0143655 A1 | 10/2002 | Elston et al. | |
| 2003/0014330 A1 | 1/2003 | Showghi et al. | |
| 2003/0018531 A1 | 1/2003 | Mahaffy et al. | |
| 2003/0065565 A1 | 4/2003 | Wagner et al. | |
| 2003/0078793 A1 | 4/2003 | Toth | |
| 2003/0225622 A1 | 12/2003 | Doan | |
| 2004/0035464 A1 | 2/2004 | Ford et al. | |
| 2004/0107170 A1 | 6/2004 | Labrou et al. | |
| 2004/0199425 A1 | 10/2004 | Van Luchene et al. | |
| 2005/0024564 A1 | 2/2005 | Vogels et al. | |

FOREIGN PATENT DOCUMENTS

| | | |
|---|---|---|
| WO | WO 83/04327 | 12/1983 |
| WO | WO 90/14991 | 12/1990 |
| WO | WO 96/37857 | 11/1996 |
| WO | WO 99/16700 | 4/1999 |
| WO | WO 00/65514 | 11/2000 |
| WO | WO 01/20444 A1 | 3/2001 |
| WO | WO 01/35359 A1 | 5/2001 |
| WO | WO 01/43095 A2 | 6/2001 |
| WO | WO 01/97206 A1 | 12/2001 |
| WO | WO 02/23470 A1 | 3/2002 |
| WO | WO 02/25516 A2 | 3/2002 |
| WO | WO 03/034265 A1 | 4/2003 |
| WO | WO 03/052665 A1 | 6/2003 |
| WO | WO 03/067369 A2 | 8/2003 |
| WO | WO 03/088109 | 10/2003 |
| WO | WO 03/096159 A2 | 11/2003 |
| WO | WO 2004/034189 | 4/2004 |
| WO | WO 2004/040826 | 5/2004 |
| WO | WO 2004/062247 | 7/2004 |

OTHER PUBLICATIONS

Richtel, "The Long-Distance Journey Of A Fast-Food Order", The New York Times, Technology Section, Apr. 11, 2006.

Search Results, 47 Pages, Feb. 28, 2005.

Michael Fitzgerald, "A Drive-Through Lane to the Next Time Zone", *The New York Times, Sunday Business*, Jul. 18, 2004.

Thomas L. Friedman, "Flatburgers and Fries", *The World is Flat, a Brief History of the Twenty-First Century*, pp. 40-42.

Alan J. Liddle, Out-of-store order technology rewards guests, fast-food operators, *Nation's Restaurant News*, vol. 39, No. 2, Jan. 10, 2005.

* cited by examiner

FIG. 5A

| 802 | Class | 804 | Guest Check | | Level 806 |
|---|---|---|---|---|---|
| 808 | Order | | Order #591456 | | 0 |
| | ItemLine | 810 | 1 Big Mac | 2.29 | 1 |
| | OptionLine | 812 | no onions | | 2 |
| | OptionLine | 814 | extra mustard | | 2 |
| | ItemLine | 816 | 2 EVM #1 SS | 9.78 | 1 |
| | ComponentLine | 818 | Dbl QP/Cheese | | 2 |
| | OptionLine | 824 | side pickles | | 3 |
| | ComponentLine | 820 | SS Fries | | 2 |
| | OptionLine | 826 | no salt | | 3 |
| | ComponentLine | 822 | SS Coke | | 2 |
| | ItemLine | | 1 Lg Coke | 1.29 | 1 |
| | SubtotalLine | | Subtotal | 13.36 | 1 |
| | TaxLine | | MA Tax 5% | 0.67 | 1 |
| | TotalLine | | Total | 14.03 | 1 |
| | TenderedLine | | Cash Tendered | 20.00 | 1 |
| | ChangeLine | | Change | 5.97 | 1 |

ORDER PROCESSING

TECHNICAL FIELD

This description relates to order processing.

BACKGROUND

Order processing occurs in a very wide variety of settings. In some settings, the orders are for goods or services, for example, consumer goods that are to be prepared and delivered quickly after the orders are placed.

In restaurants serving what is sometimes referred to as "fast food", customers line up at one or more queues at a front counter and place orders for food items. Such restaurants are also sometimes referred to as "quick-serve" restaurants. The customers wait nearby until the orders are processed and delivered at the front counter. Customers then walk to tables with their delivered orders. In this scenario, workers at the restaurant's front counter enter the customer orders into registers, assemble the orders (from food items that are made in response to the orders or are prepared in advance), and deliver the orders. Food items include entrees, appetizers, beverages, and desserts, for example, and any other edible items, whether prepared to order or prepared in advance.

In general, quick-serve restaurants are distinguished from other types of restaurants by the short time interval between when a customer places an order and when the customer receives the order. In some cases this period could be as long as five or ten minutes or as short as 10 or 15 seconds.

Quick-serve restaurants also often have drive-through service that enables customers to place orders at an order point and pick up orders at a delivery point while remaining in an automobile. To reduce the delay during busy periods, multiple drive-through service lanes can be provided.

Order processing for some kinds of goods and services, for example, clothing or electronic products, is done using telephone call centers.

SUMMARY

In general, in one aspect, the invention features a method that includes, at a place at which goods or services are offered, enabling orders for goods or services to be received from electronic devices situated at multiple points at which orders are to be placed, and receiving the orders electronically through a communication medium that enables automatic identification of the location at which each of the orders is placed.

Implementations of the invention may include one or more of the following features. The place at which goods and services are offered includes a place at which each of the goods or services is to be provided quickly in response to the order. The place at which goods and services are offered includes a quick-serve restaurant. The electronic devices include voice receiving devices. The electronic devices are within the place at which the goods or services are being offered. In some examples, the electronic devices are not within the place at which the goods or services are being offered. The goods and services are made in response to the orders. The devices include telephone handsets. The devices include voice enabled computers using a voice over internet protocol. The multiple points at which the devices are situated are determined based on the IP addresses of the devices. The electronic devices include interactive terminals. The multiple points include points at which the goods or services are to be delivered. The points at which orders are placed include tables.

The communication medium includes a network. The network includes a telephone network. The communication medium includes a telephone switch. Information about the points at which orders are placed is provided to call management software running on a computer. Orders for the goods or services are entered at points different from the points at which the orders are placed. The goods or services are delivered at points different from the points at which the orders are placed. The points at which orders are placed include drive-through points. The points at which orders are placed include kiosks. The points at which orders are placed include areas of the place of commerce in which adults supervise children at play. The location at which an order is placed is associated electronically with a location at which the goods or services are to be delivered. The association of the order location with the delivery may be changed after the order is placed and before the order is delivered. Each of the orders is associated electronically with one of the order points and with a point at which the goods or services are to be delivered. The association may be changed after the order is placed and before the order is delivered.

A class of service is automatically inferred for each of the orders based on the point at which the order is placed. The class of service includes the urgency with which the goods or services must be delivered. The class of service depends on a status of a person who is placing an order. The status includes a mode of transportation. A class of service is associated electronically with each of the order points. The association may be changed at any time. One of the order points includes a standalone phone tree at an entrance to a play place of a quick-serve restaurant. One of the order points includes a front counter of a quick-serve restaurant.

In general, in another aspect, the invention features apparatus that includes, in a place at which goods and services are offered: a telephone switch, telephones located at multiple points at which orders for the goods or services are to be placed, a telephone network connecting the telephones to the switch, and software that uses information received from the switch about which of the telephones is a source of a call, to infer points at which the goods and services being ordered should be delivered.

In general, in another aspect, the invention features apparatus comprising stations within a place at which goods or services are offered, at least one of the stations being a station at which orders for the goods or services are entered and at least one of the stations being a station at which the goods or services are prepared for delivery, and a network interconnecting the stations within the place, the network being configured for communication among the stations using a TCP/IP protocol.

In general, in another aspect, the invention features a method that includes receiving from an electronic device located in a play place of a quick-serve restaurant, orders for meals.

Implementations of the invention may include one or more of the following features. The orders are received by telephone. The goods include quick-serve food. The remote delivery point includes a quick-serve restaurant. Prices of goods with respect to the delivery point are available at the order entry point. There are also additional remote delivery points at which the goods are to be prepared for delivery.

In general, in other aspects, the invention features methods in which orders for goods are received electronically at an order entry point, the orders to be fulfilled by delivery of the goods at a remote delivery point at which the goods are to be quickly prepared in accordance with the orders for delivery to customers at the delivery point. In various aspects, the orders are received by telephone, the goods comprising quick-serve food, the remote delivery point comprising a quick-serve restaurant, the prices of goods with respect to the delivery point are available at the order entry point, and the goods are prepared for delivery at additional remote delivery points.

Implementations of the invention may include one or more of the following features. Prices of the goods differ for different ones of the delivery points and the different prices with respect to the different delivery points are available at the order entry point. The prices of the goods further differ for different ones of the order points. The different delivery points are located in multiple time zones, the volume of received orders from all of the time zones varies in a predictable way during a -hour period, and staff employed at the order entry point are balanced in a manner that takes advantage of the predictable variation. Menus of goods differ for different ones of the delivery points and the different menus with respect to the different delivery points are available at the order entry point. The different delivery points are associated with different brands. The different delivery points are located in different states or territories.

In general, in another aspect, the invention features a method that includes receiving orders for quick-serve meals by telephone at a call center, and sending information about the orders electronically to at least two different quick-serve restaurants at which the respective meals are to be delivered.

These and other embodiments may have one or more of the following advantages. Order processing is made simpler and less expensive. Placing orders and receiving them is made simpler, easier, and more comfortable. New modes of receiving, entering, preparing, and delivering orders are made possible. In the case of a quick-serve restaurant, customers can sit comfortably at a table to order food and while waiting for delivery. Customers can watch their children play in a play area while ordering food and then waiting for the food. The multi-lane, multi-order point drive-through food order and delivery system enables restaurant workers to match customers with customer food orders regardless of the sequence of customer arrivals at the food delivery points, through the use of customer images captured at the multiple order points, as well as other means. Using a telephone call center for order entry reduces labor cost and enables specialized call center workers to handle surges in business at meal times. Moreover, by handling calls from restaurants in different time zones, the call center staff can remain fully utilized all day long. Worker's compensation insurance is less expensive for call center workers than for in-restaurant staff because of the relatively safer work environment.

Other advantages will become apparent from the following description and from the claims.

DESCRIPTION OF DRAWINGS

FIG. 5A is another graphical user interface for matching customers with food orders.

DETAILED DESCRIPTION

In what follows, an "order" is a set of items chosen by a customer. These items can include both standard items and customized items. For example, in the context of a quick-serve restaurant, the order could include a standard "large fries" and a customized "hamburger with pickles and onions, no mustard or mayonnaise.". An "order point" is a logical location where a customer places his order, for example, the order point could be at the front counter or at the drive-through lane. An "order entry point" is a logical location where information about the order is entered in a machine-based system that manages orders. A "payment point" is a logical location at which payment is made for the order, for example, a cashier position at a front counter. "Marking" an order is an action that labels a customer's order with information that is useful for uniquely identifying the customer at the time of delivery. A "delivery point" is a logical location where the customer receives the order, for example, at a table in a restaurant.

Figure 1:
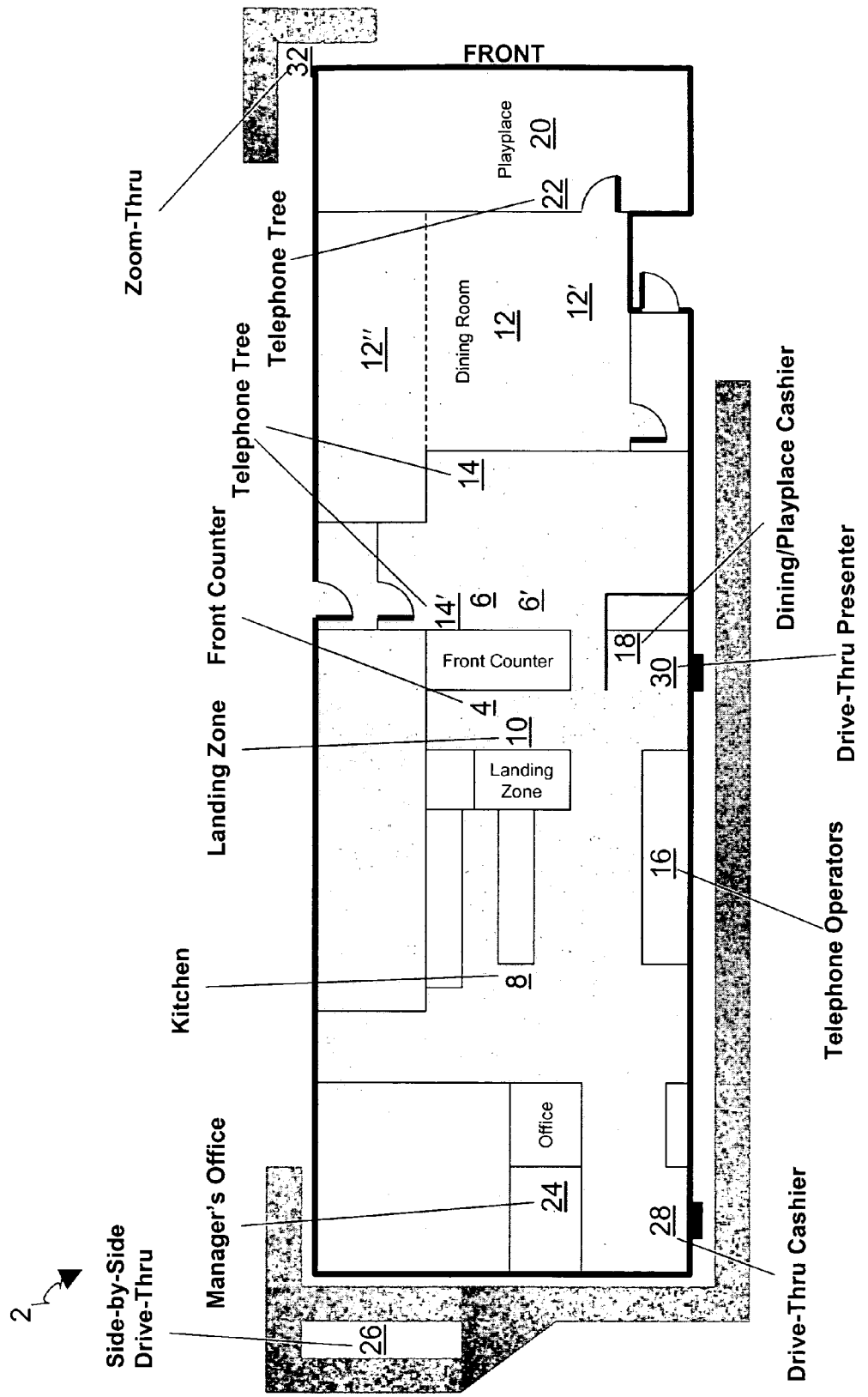
FIG. 1 is a schematic view of a restaurant.

Referring to FIG. 1, in one example of a commercial context in which orders for goods or services are processed, a quick-serve restaurant 2 includes a front counter 4, an order area 6, and a delivery area 6'. The restaurant 2 uses restaurant management software and a database to manage the placing of orders, the entry of orders, the preparation of the food in accordance with the orders, and the assembly and delivery of the orders, among other things. In one mode of operation, workers at the front counter 4 receive food orders and payment from customers in an order area 6 (which then serves as both the order entry point and the payment point) and enter them into the database using order entry terminals. Customers in the delivery area 6' (which then serves as the delivery point) wait for deliveries of the orders from the front counter 4. At a kitchen 8, workers produce food items to fulfill the orders and send the food items to a landing zone 10.

The restaurant management software determines production requirements for food items at any given time from the orders stored in the database, determines production instructions from these requirements, and displays the production instructions on kitchen video displays (not shown). The restaurant management software develops these production instructions by matching production resources with production requirements and balancing the loading of the resources. Production resources include grills for cooking food. Thus, in some examples, the restaurant management software can balance the production loading of kitchen grills by displaying different orders to be processed on kitchen video displays in front of different kitchen grills. Workers at the front counter 4 take food items from the landing zone 10 and from other supplies of prepared food items, assemble the orders according to order information presented by the restaurant management software on the kitchen video displays, and deliver the orders to customers in the delivery area 6'. Customers leave the restaurant 2 with the food orders or consume the food orders in a dining room 12. The dining room 12 is divided into a seating area 12' and a café 12". The restaurant may be organized in a wide variety of other configurations. And a wide variety of modes of order taking, order entry, food item preparation, order assembly, and order delivery can be used.

For example, in another mode of operation, customers place orders using telephones (not shown) while sitting at tables (the order points) in the cafe 12". Order takers working at an order entry area 16 (the order entry point) receive the calls from the telephones at the tables. Each telephone at a table in the cafe 12" has a unique extension identifier in a telephone switch (not shown), enabling the restaurant management software to associate an order with a specific table (order point and delivery point) automatically. When the order takers at the order entry area 16 enter the orders, the identities of the tables from which the orders are placed are thus automatically entered into the database from information provided by the telephone switch. Alternatively, the delivery point information may be entered manually by the order taker from information displayed at order entry stations at the order entry area 16. As before, workers in the kitchen 8 process the food items according to the orders (for example, an order may request a large hamburger, well done, with mustard and mayonnaise, on a sesame seed bun). Expeditors in the landing zone 10 assemble the orders and deliver the orders to tables in the cafe 12" according to the identities of the tables associated with each order. Customers may pay by either swiping a credit card in a machine (not shown) at the customer's table or by making a cash payment to expeditors delivering the orders at tables in the cafe 12". Customers eat the food at tables in cafe 12".

Many other modes of operation are also possible, not limited to the following examples.

In another mode of operation, customers place orders at "free-standing" telephone trees 14 and 14' to order takers at order entry area 16. The telephone trees 14 and 14' are clusters of telephones that are separate from tables or counters and are available for calls to order entry area 16. Because the telephones in telephone trees 14 and 14' are not associated with particular tables, a method is provided to enable the customers and the expeditors to correctly associate an order with a table at which it is to be delivered. One example method is to provide table tents to the customers to post on the table at which they are going to eat. Each table tent bears a unique number large enough to be visible at some distance. While placing an order, the customer communicates the tent number to the order taker. The order taker enters the number into the system so that it becomes associated with the order in the database. After placing the order, the customer pays at the front counter 6', displays the table tent on the table, and waits for the delivery of the order.

In another mode of operation, customers place orders at a telephone tree 22 (or simply an individual telephone) located in a playplace 20, where young children can play while families wait for deliveries of orders. Parents placing orders at telephone tree 22 can supervise their children playing in the playplace 20. Table tents can be used, as in the earlier example, to identify the table or other delivery point at which the customer wants to receive the order.

In some examples, customers in the restaurant 2 can directly place orders using customer self-service kiosks in a designated area (not shown) away from dining room 12. Each customer kiosk is linked to the database. While the order is being placed, the kiosk takes a picture of the customer with a digital camera and enters the image into the database, linked to the order. When the order is finished, an expeditor delivers it to the customer matching the picture and seated in dining room 12 and collects a cash payment, unless the customer has already made payment by swiping a credit card at the customer self-service kiosk. More details of the customer self-service kiosks are explained below.

The restaurant 2 also includes a manager's office 24 with access to real-time data describing orders and food production status presented by the restaurant management software.

In another mode of order processing, customers can place and pick up orders using a drive-through lane outside the restaurant. Using the drive-through mode, the customers place orders (with order takers in the order entry area 16) through telephones at one or more order points located in one or more lanes of a drive-through 26, view their orders on drive-through displays (not shown), pay a cashier through a window 28 (the payment point), and pick up the orders through a delivery point window 30. Additional order points and drive-through displays are provided ahead of the lanes of the drive-through 26 in a so-called zoom-through 32. Customers who do not need extra assistance from live order takers and can pay quickly using a credit card, place orders at order points in the lanes in the zoom-through 32 with workers in the area 16. Such extra assistance includes questions about menu choices. Customers who do need the extra assistance from operators in the area 16 place orders at order points in the lanes of the drive-through 26 with operators in the order entry area 16. Customers who enter in the zoom-through 32 and need extra assistance from a live order taker are asked to move forward to the drive-through 26.

Cameras (not shown) at the order points in drive-through 26 and zoom-through 32 are configured to capture digital images of customers in their automobiles placing orders. For example, the digital cameras used may be part of the restaurant's security surveillance system. In such a case, the restaurant management software directs the security system to extract a still frame from the video stream coming from the appropriate one of its cameras. The same camera may thus be used for both general security purposes as well as customer identification. These digital images are stored in the database, wherein they are associated with the related orders. When a customer arrives at the cashier at the window 28, the cashier views a gallery of digital customer pictures on a display and identifies the customer by matching the correct displayed image with the live customer. Since there are only a few pictures on the display to compare with the customer at the window 28, a low-resolution image, for example, of at least 180 horizontal pixels by 135 vertical pixels, is sufficient to match the customer with a picture. Based on this match, the restaurant management software presents a bill for the order to the cashier. The cashier tells the customer the amount due, and the customer pays the cashier. When the customer arrives at a delivery point at the window 30, a worker views the customer picture gallery again to match the customer's picture (and related order) to the live customer. The restaurant management software presents a list of items in the order along with an indicator that the bill has been paid or not. If the bill has been paid, then the worker assembles the order and delivers it to the customer.

In some of the examples discussed above, the order takers have been removed from their usual place at the order counter of the restaurant to a place in the non-public parts of the restaurant. But the order takers need not even be in the restaurant. They could be, for example, in an adjacent or nearby building directly connected to the telephone switch of the restaurant.

In other examples, the order takers are located at a place that is remote from the restaurant 2 and is not directly wired to the telephone switch of the restaurant. The remote location can be a telephone call center. By locating the order entry point in a telephone call center, the process of receiving and entering the orders can be streamlined and made quicker. Hiring, management, and training of the order takers can be separated from hiring, management, and training of the workers in the restaurant. Labor costs may be reduced. For example, the workers' compensation insurance costs for employees working in the call center, an office environment, may be lower than for employees working the relatively more hazardous environment of the restaurant.

Additional efficiencies can be achieved by locating order takers for multiple restaurants in the telephone call center. By handling a larger volume of order taking, the order takers can be more highly trained and more focused on the order taking activity than may be possible in a restaurant where the order taker may have to take on additional responsibilities. Less overall staff is required because it is possible to utilize all the capacity of an order taker who services customers at multiple restaurants. Furthermore, the multiple restaurants 2 can be located in multiple time zones. Because the volume of received orders from each of the time zones varies in a predictable way during a twenty-four hour period, an intense order entry period in one time zone may be followed by an intense order entry period in the next time zone, and the load on the central order takers can be balanced in a manner that takes advantage of this predictable variation. The telephone call center is described in more detail below.

Figure 2:
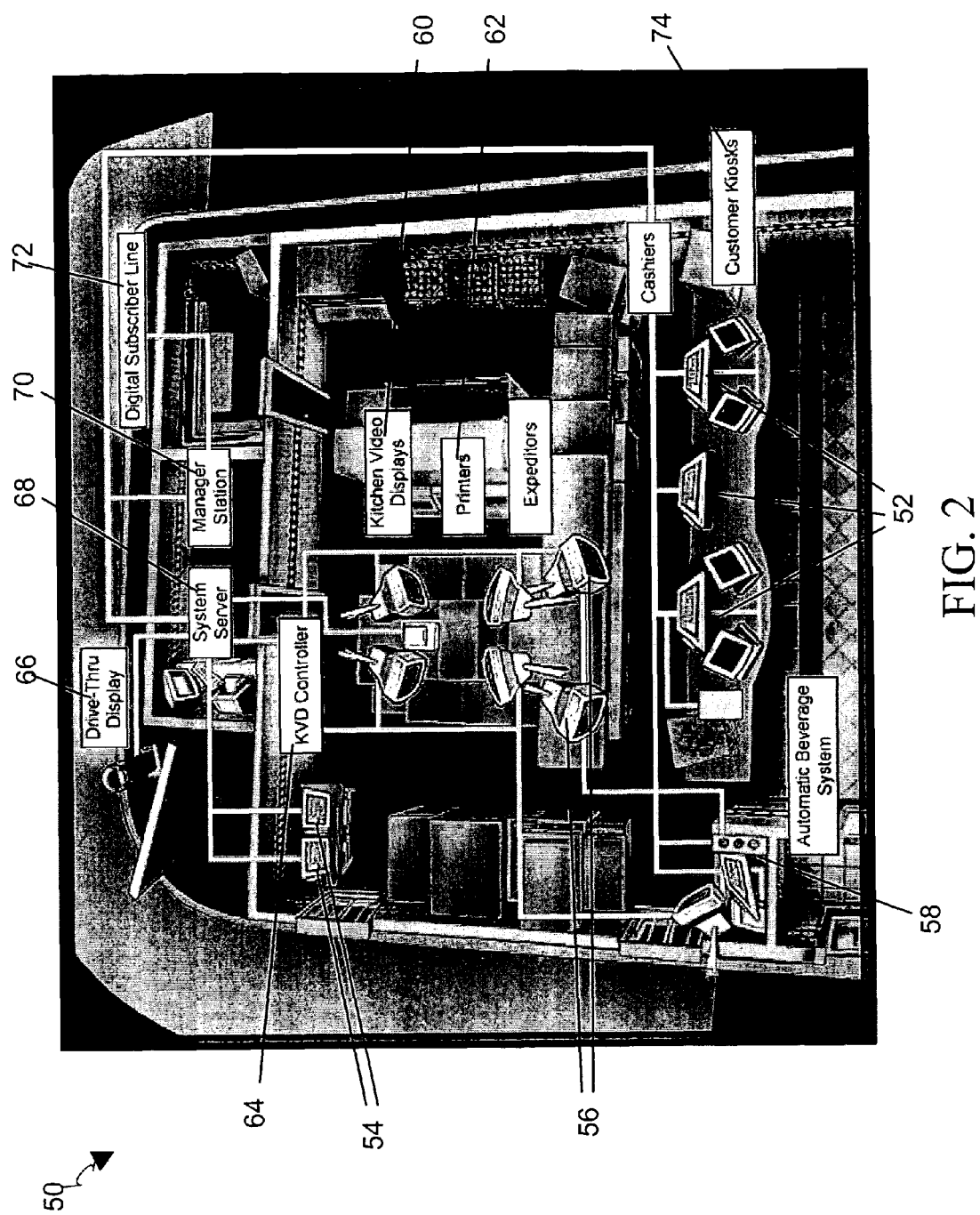
FIG. 2 is another view of the restaurant of FIG. 1.
Figure 3:
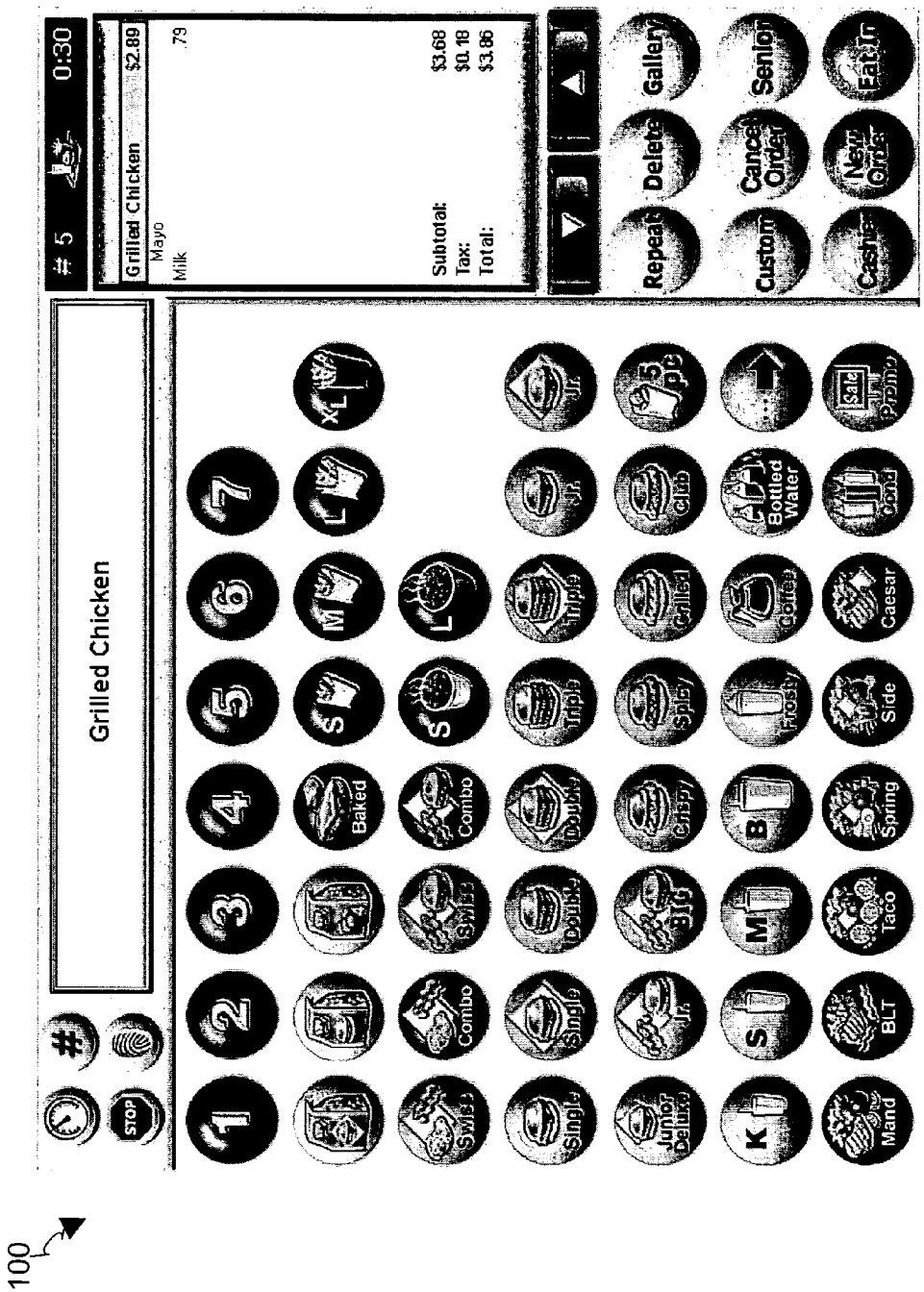
FIG. 3 is a graphical user interface for order entry.
Figure 4:
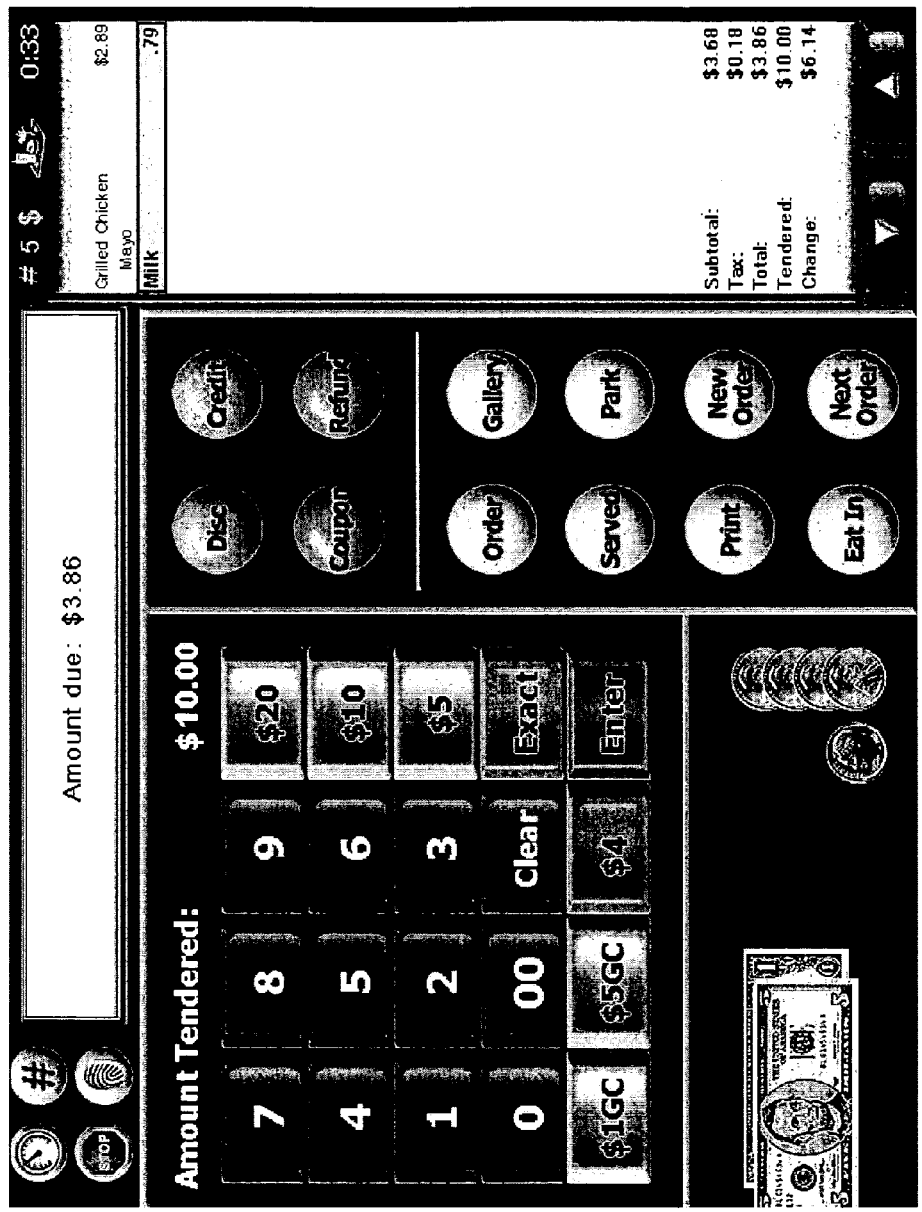
FIG. 4 is a graphical user interface for accepting payment for orders and making change.

Referring to FIG. 2, view 50 of the restaurant 2 shows order terminals 52 for order takers at the front counter 4. In some examples, referring to FIG. 3, order takers at the front counter 4 use a graphical user interface 100 displayed on the order terminals 52, to enter orders. In some examples, referring to FIG. 4, cashiers at the front counter 4 use a graphical user interface 125 displayed on the order terminals 52 to enter payment for orders and provide change to customers. Drive-through cashiers in the payment area 28 can also use the graphical user interface 125 displayed on the terminals 54 to enter payment and provide change.

Figure 5:
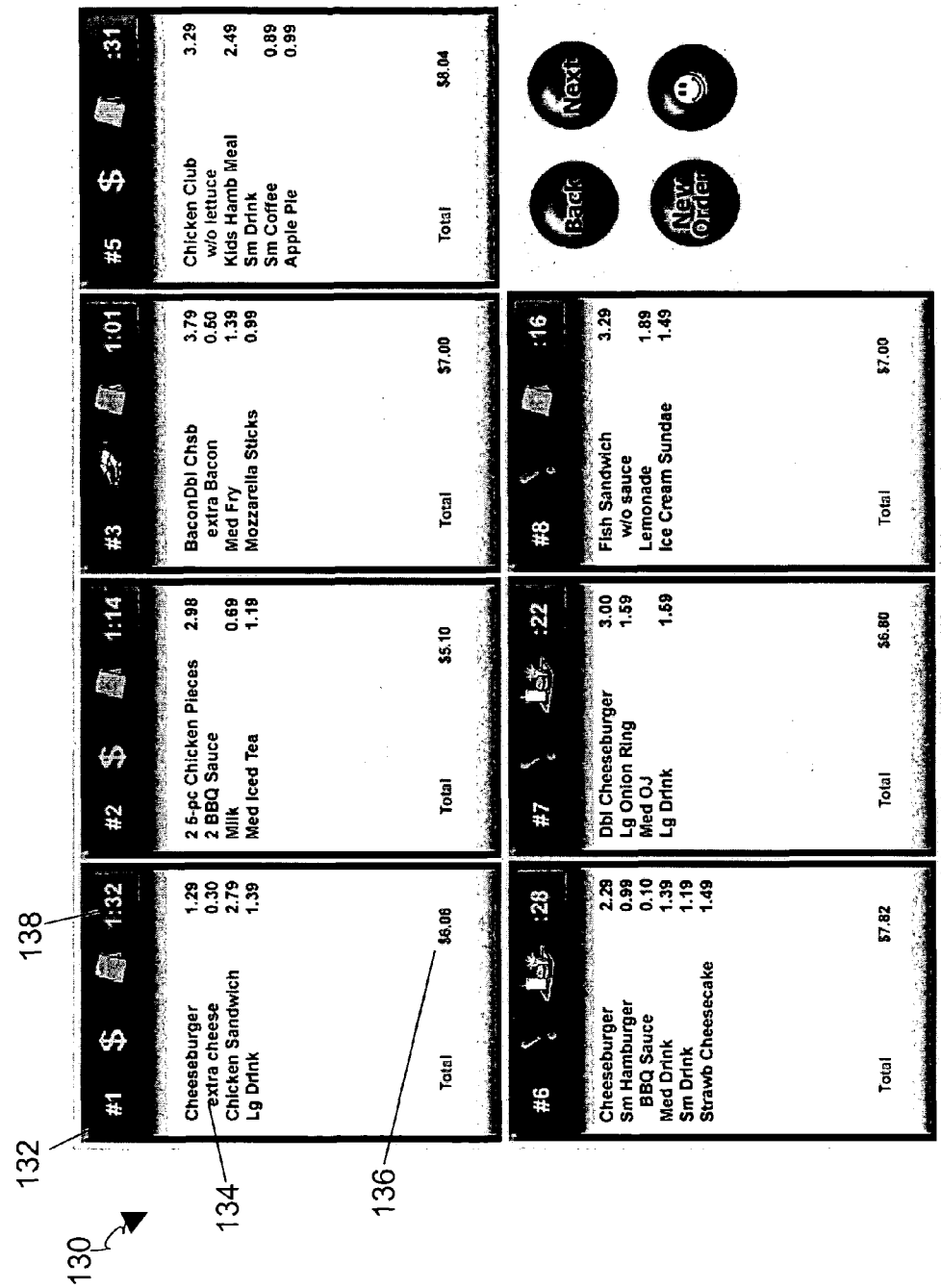
FIG. 5 is a graphical user interface for matching customers with orders.

Referring to FIG. 5, cashiers at the front counter 4 can also use a graphical user interface 130 displayed on the order terminals 52 to match a customer with a food order. The graphical user interface 130 shows a gallery of unfilled orders each with an order number 132, the contents of the order 134, and the price 136 for each unfilled order. The graphical user interface 130 also includes an elapsed time 138 since a customer's order was entered.

Figure 5A:
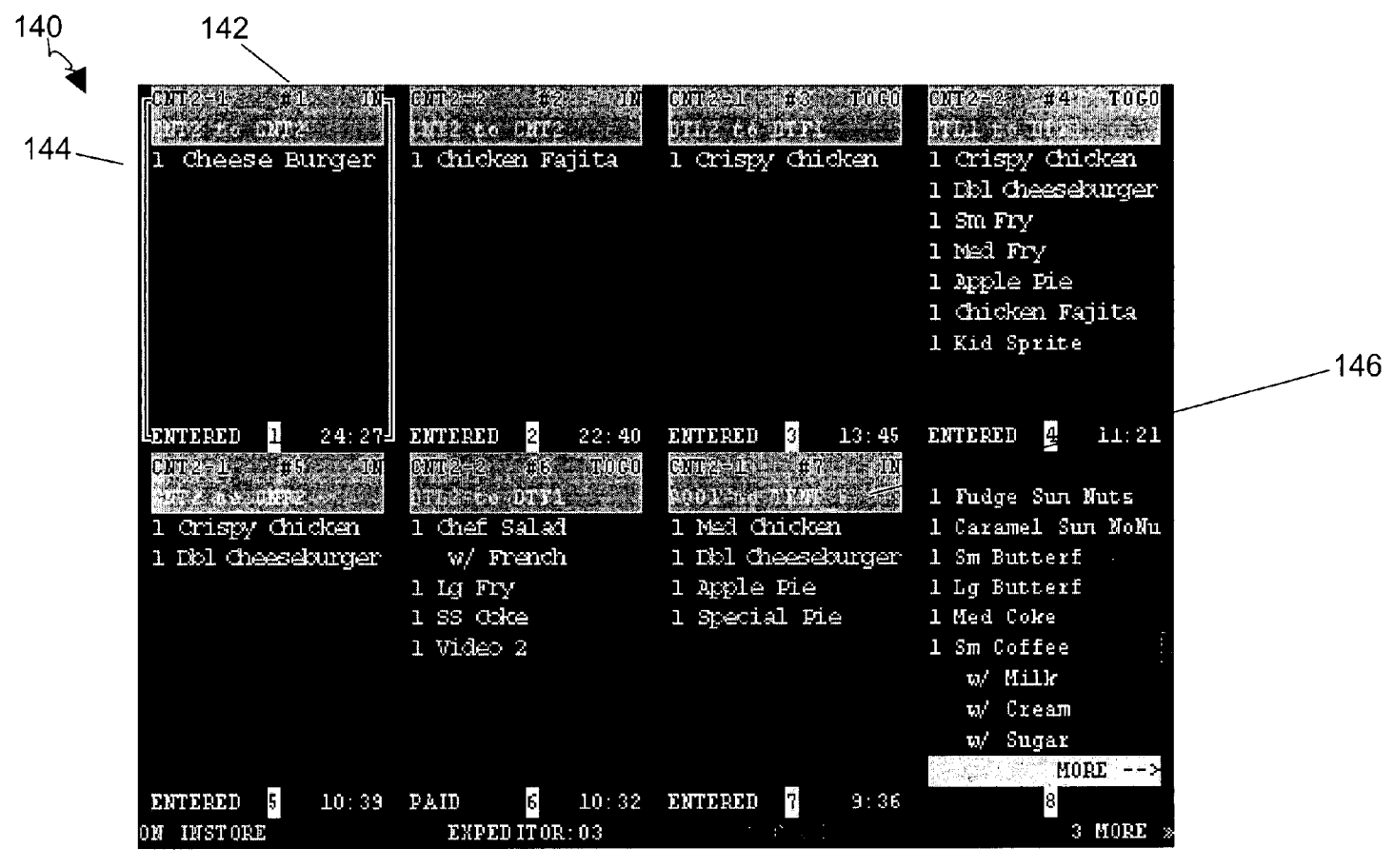

Expediters working at the front counter 4 and serving food to the dining room 12 view the terminals 56 to assemble the orders. Referring to FIG. 5A, these expediters at the front counter 4 can use a graphical user interface 140 to match a customer with an order. The graphical user interface 140 shows a gallery of unfilled orders each with an order number 142, the contents of the order 144, and an indication of the delivery point, for example, delivery at a table bearing a table tent number 146. The expediters match a customer with an order by comparing the table tent number 146 or the order number 142 of a customer with the orders shown in the graphical user interface 140. Once a food order is identified on the graphical user interface 140, an expeditor can read the food items for the order, assemble the order accordingly, and deliver it to the location indicated.

Figure 5B:
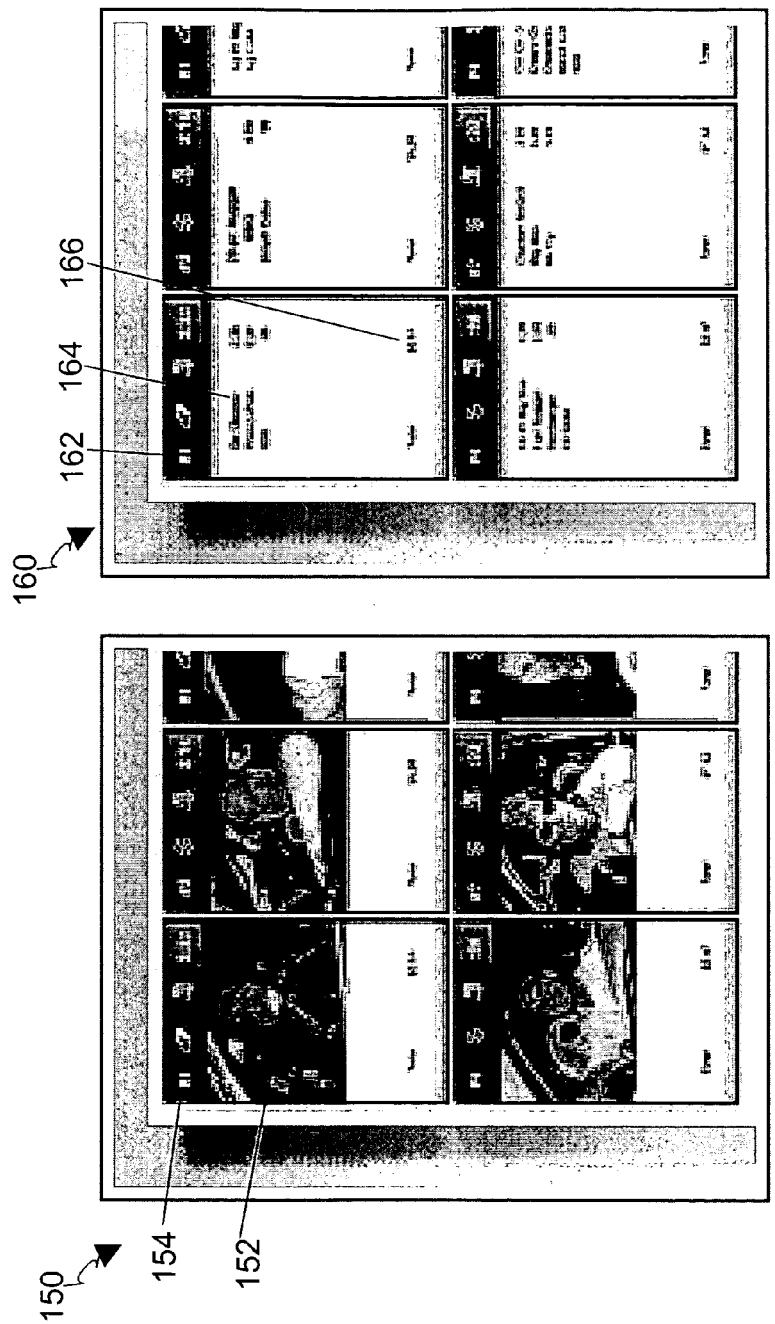
FIG. 5B is a graphical user interface for matching customers in a drive-through window with orders.

Referring to FIG. 5B, drive-through cashiers in the payment area 28 (the payment point) and drive-through presenters in the drive-through delivery area 30 also can use interfaces 150 and 160 to match the current customer at the window with an order. The interface 150 displays pictures 152 of customers with unfilled orders in an order gallery. The restaurant management software sorts the unfilled or pending orders in a sequence in which the customers are expected to appear at the delivery point (based on when the customers enter their orders) and puts this sequence into an order gallery. Interface 150 also includes an order number 154. The drive-through cashiers in the payment area 28 and the drive-through presenters in the delivery area 30 each click on a picture 152 in the interface 150 that matches the view of the current customer at the cashier's or presenter's window. This highlights an order in the interface 160. Interface 160 includes an order gallery with unfilled orders that includes for each unfilled order an order number 162, the contents of the order 164, and the price 166. The drive-through cashiers know how much to charge a customer by viewing price 166 of a highlighted order in interface 160 and the drive-through presenters know how to assemble an order by viewing contents of highlighted order 164 in interface 160.

In addition to the terminals, registers, and workstations that display and receive order information, the restaurant includes other hardware devices that interact with the restaurant management software.

For example, an automatic beverage system 58 (FIG. 2) automatically dispenses the drink portion of an order. The restaurant management software manages the automatic beverage system 58. An example of an automatic beverage system is available from IMI Cornelius of Anoka, Minn., USA.

Figures 6, 6A:
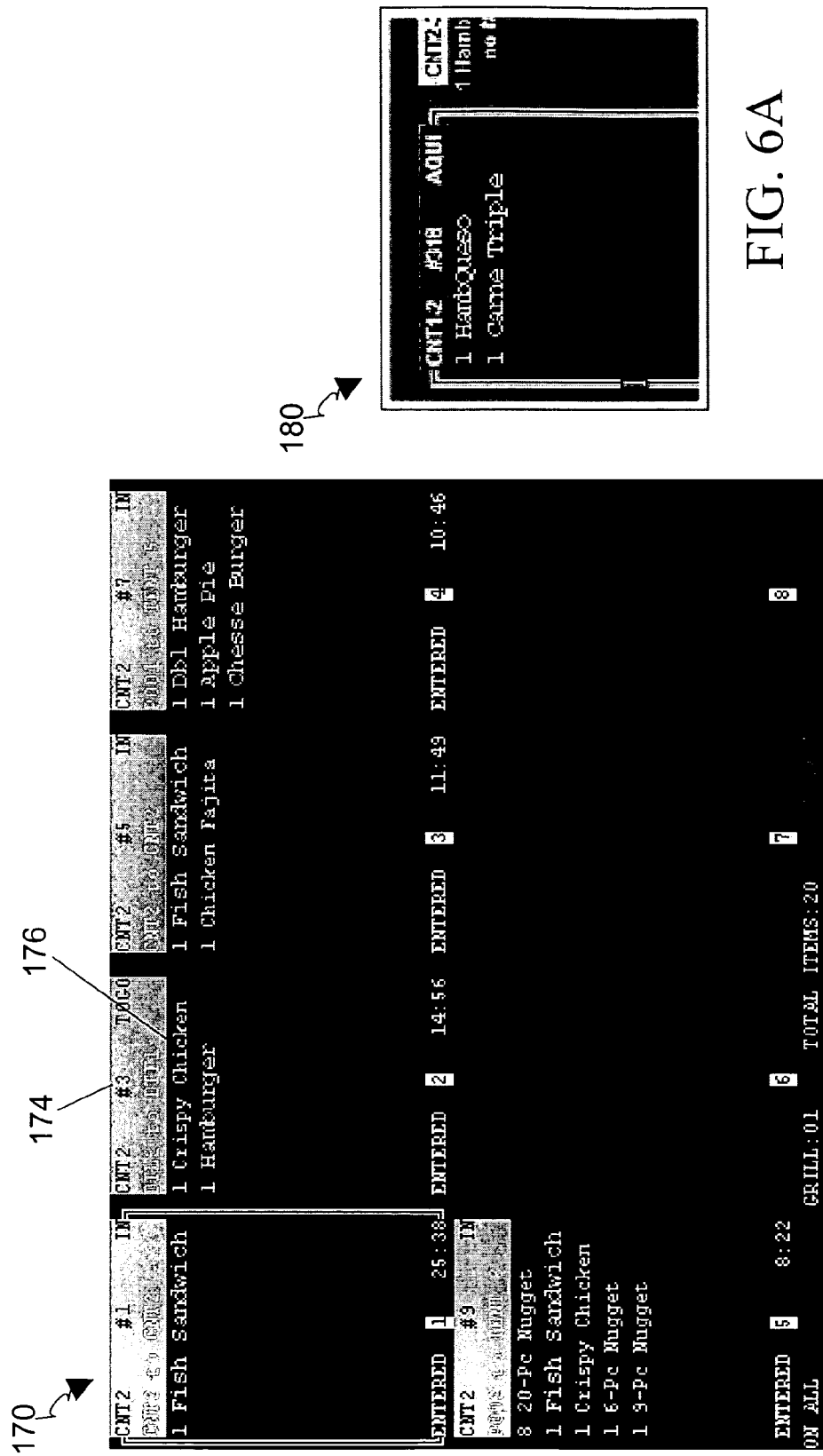
FIG. 6 is a graphical user interface to specify food production requirements and FIG. 6A is a graphical user interface to specify food production requirements in another language.

Kitchen video displays (KVD) 60 display food production requirements created by the restaurant management software. In some examples, the kitchen video displays 60 present the food production requirements using the interface 170, as illustrated in FIG. 6. A particular kitchen video display 60 is in front of grill "grill 01". The interface 170 includes an identifier 172 that indicates the identity of the grill "grill 01". The interface 170 also includes a customer order number 174 and the contents of the order 176. The interface 170 shows five of the seven orders displayed in the interface 140 because the restaurant management software has determined that grill "grill 01" can only handle the five orders. With production resource load balancing, other grills in kitchen 8 are designated to handle the other orders. In some examples, the restaurant management software can be configured to display the interface 170 in other languages such as interface 180, illustrated in FIG. 6A.

The restaurant management software uses printers 62 to print slips for custom orders for food item production. The slips are attached to orders throughout the process of food item production. The restaurant management software also uses the printers 62 to print receipts for payment for orders.

A KVD controller 64 is a software component of the restaurant management software that controls the KVDs 60.

A drive-through display 66 displays orders to customers in the drive-through 26 and zoom-through 32. This display enables each customer to get visual confirmation of his or her order.

A system server 68 manages interactions for a central computer database for the restaurant management software.

Figure 7:
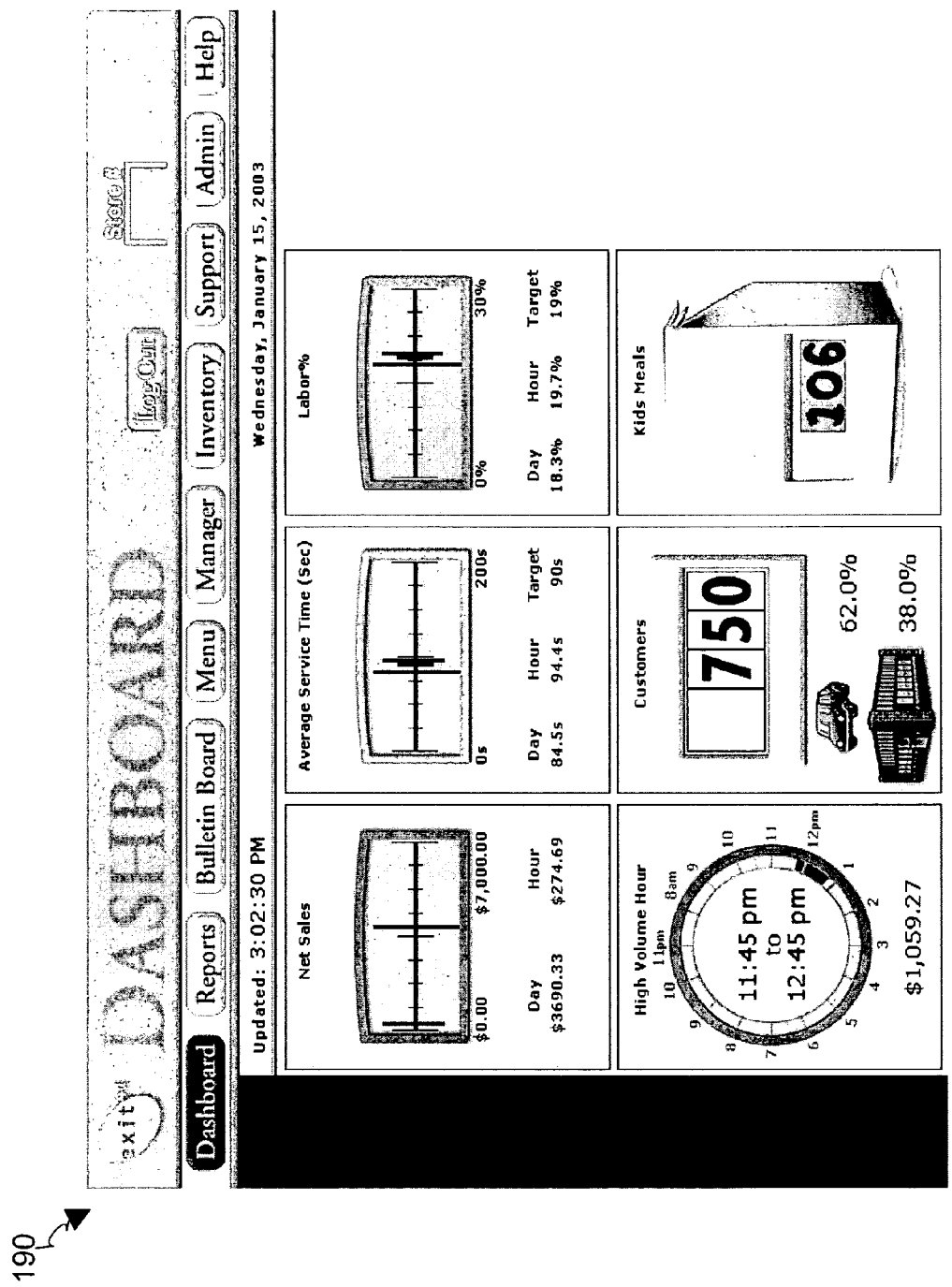
FIG. 7 is a graphical user interface for a manager of a restaurant.
Figure 7A:
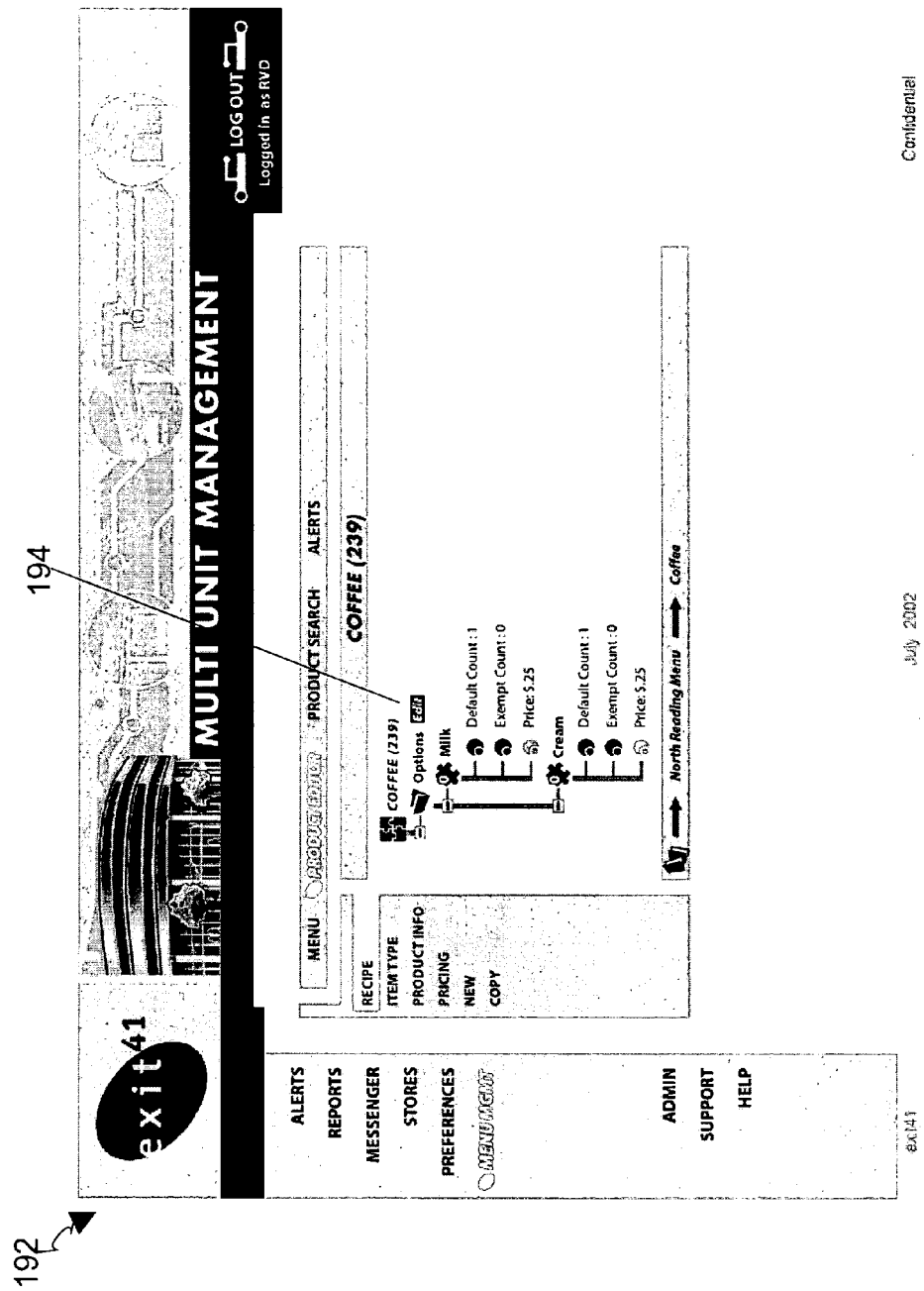
FIGS. 7A and 7B are other interfaces for a manager of a restaurant.
Figure 7B:
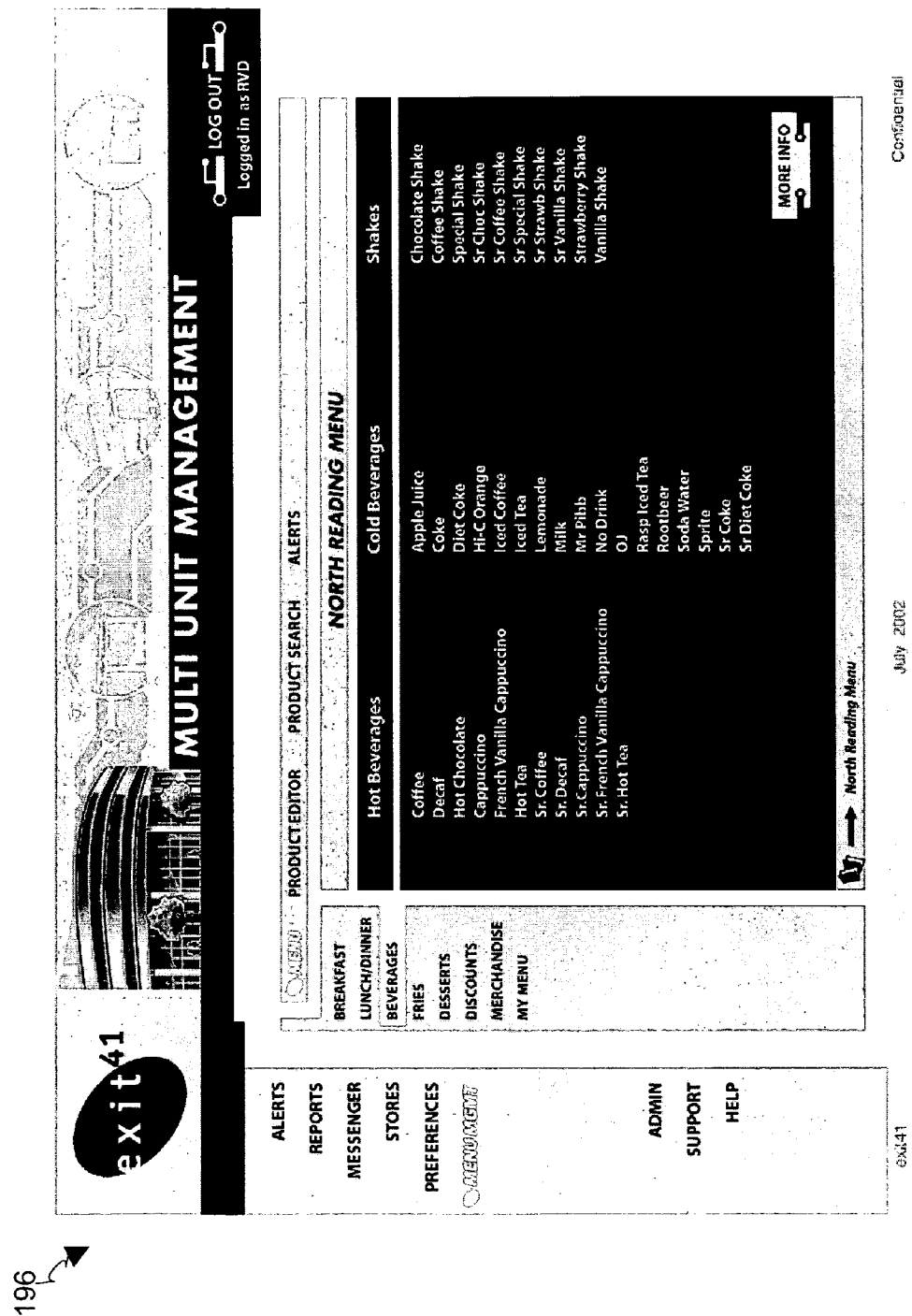

A manager station 70 allows a manager of the restaurant 2 to view food production and service activity in the restaurant. In some examples, a manager station 70 displays a graphical user interface 190, as illustrated in FIG. 7. The manager station 70 can use a broadband data line 72 to link the manager to the Internet. Referring to FIGS. 7A and 7B, managers can view information about the multiple restaurants 2 using interfaces 192 and 196 over the Internet. These managers can also modify menus and change prices using interfaces 192 and 196. An interface 192 shows a recipe for coffee with options at a particular restaurant 2. A button 194 enables a manager to modify the recipe. An interface 196 shows hot beverages, cold beverages, and shakes available at a particular restaurant 2. The manager's interface is linked directly to the database in the restaurant (without the intervention of any intermediary database or process), so that information presented to the manager is derived directly from the database of the restaurant and changes made by the manager through the interface are committed directly to the database in the restaurant.

Customer self-service kiosks 74 enable customers to enter orders without requiring a human order taker at the other end of a telephone. A customer kiosk 74 includes a camera that takes a digital picture of a customer (similarly to the taking of a picture for a drive-through customer as described earlier) during order entry so that expediters in the restaurant 2 can identify the customer for delivery of the order. The expediter uses an interface similar to the gallery of pictures and orders in interface 150 to match the customer to his or her order for payment and delivery.

Figure 8:
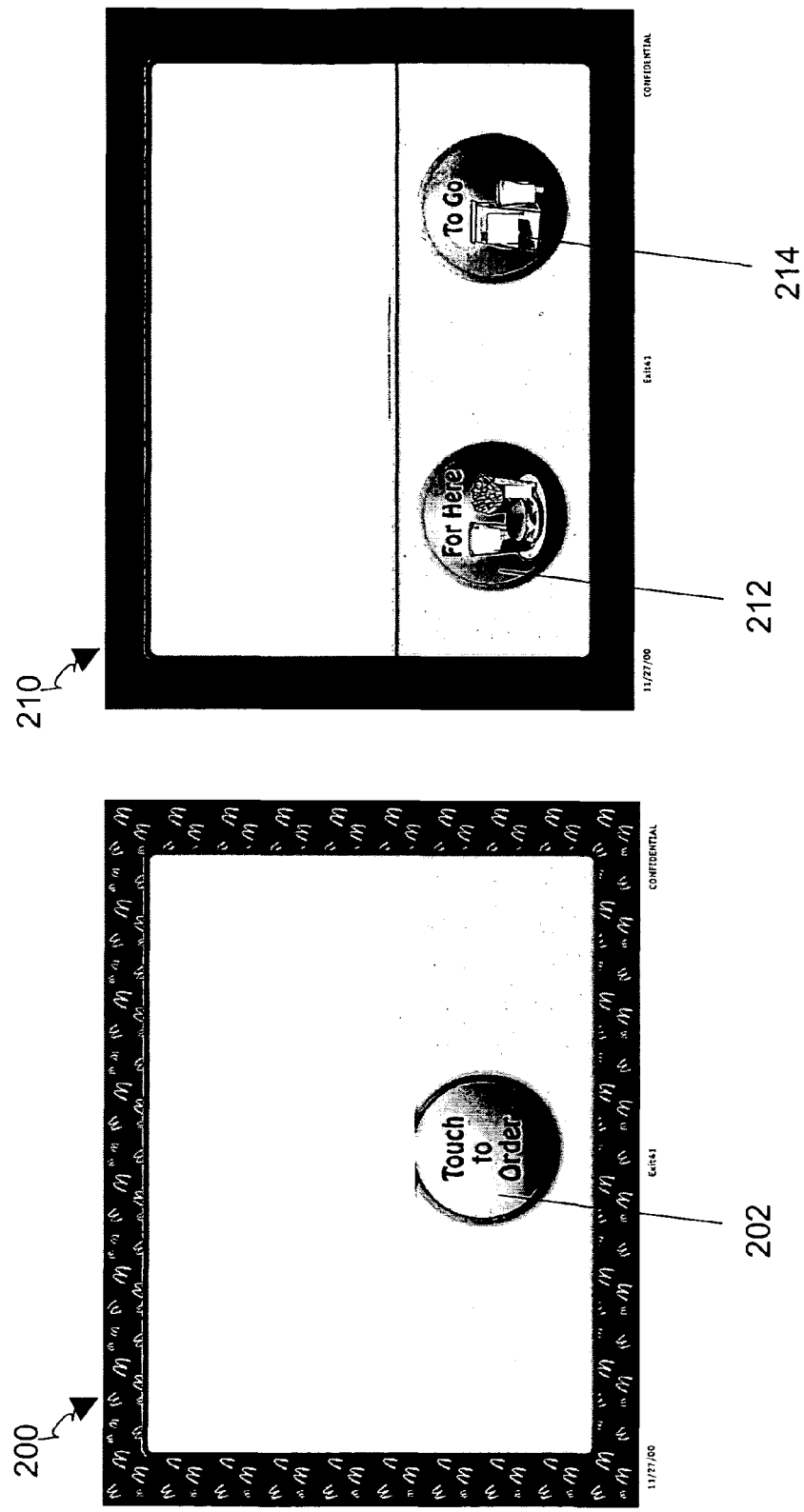
FIGS. 8–10 are graphical user interfaces for customers to enter orders by themselves.

In some examples, referring to FIG. 8, the customer kiosks 74 provide an interface 200 on a touch screen. A customer touches a button 202 to begin entering an order. The customer then touches a button 212 in an interface 210 to specify that the order is to be eaten in the restaurant 2 or the button 214 to specify that the order is to be eaten outside of the restaurant 2.

Figure 9:
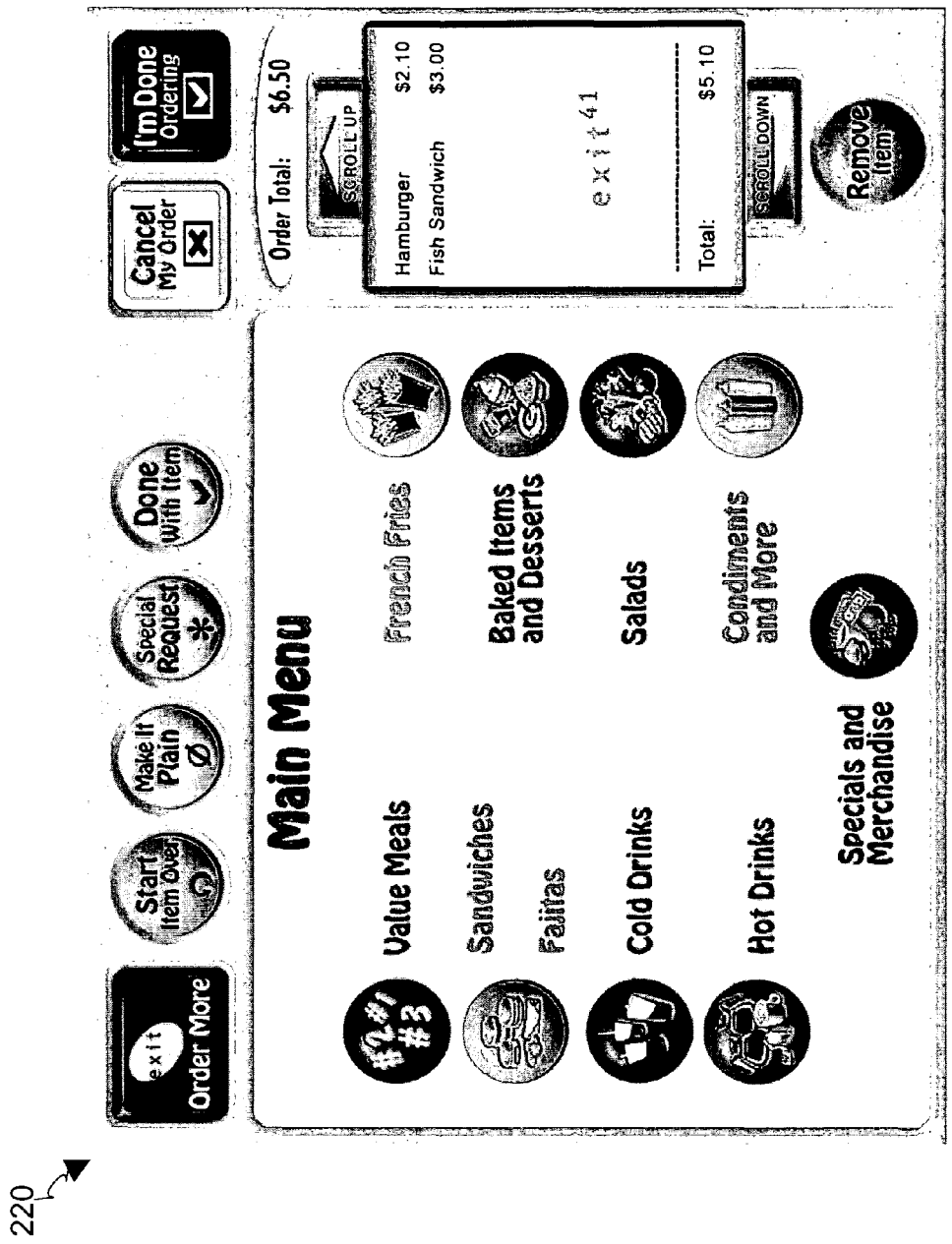
Figure 10:
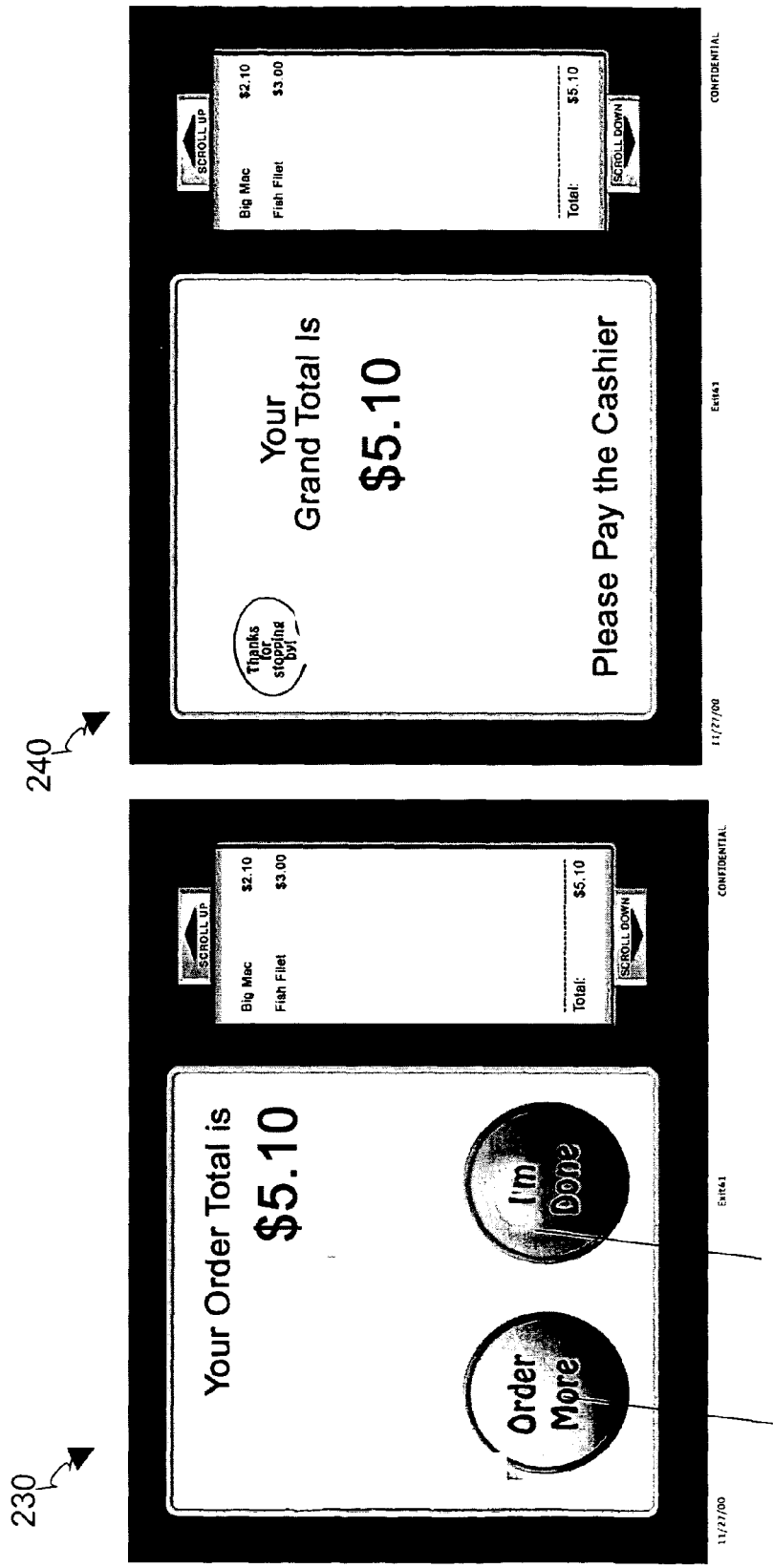

Referring to FIG. 9, an interface 220 enables the customer to add different food items to the order. Referring to FIG. 10, an interface 230 shows the customer the current order and enables the customer to enter the order by clicking on a button 232 or add more food to the order by clicking on a button 234. An interface 240 shows the customer that the order has been entered. Subsequently, the customer leaves the kiosk 74 (freeing it up for the next customer), goes to a cashier at front counter 4 to pay for his order, and waits for delivery at the front counter 4. Otherwise, the customer sits in the dining room 12 and waits for an expediter to deliver the order there.

Figure 11:
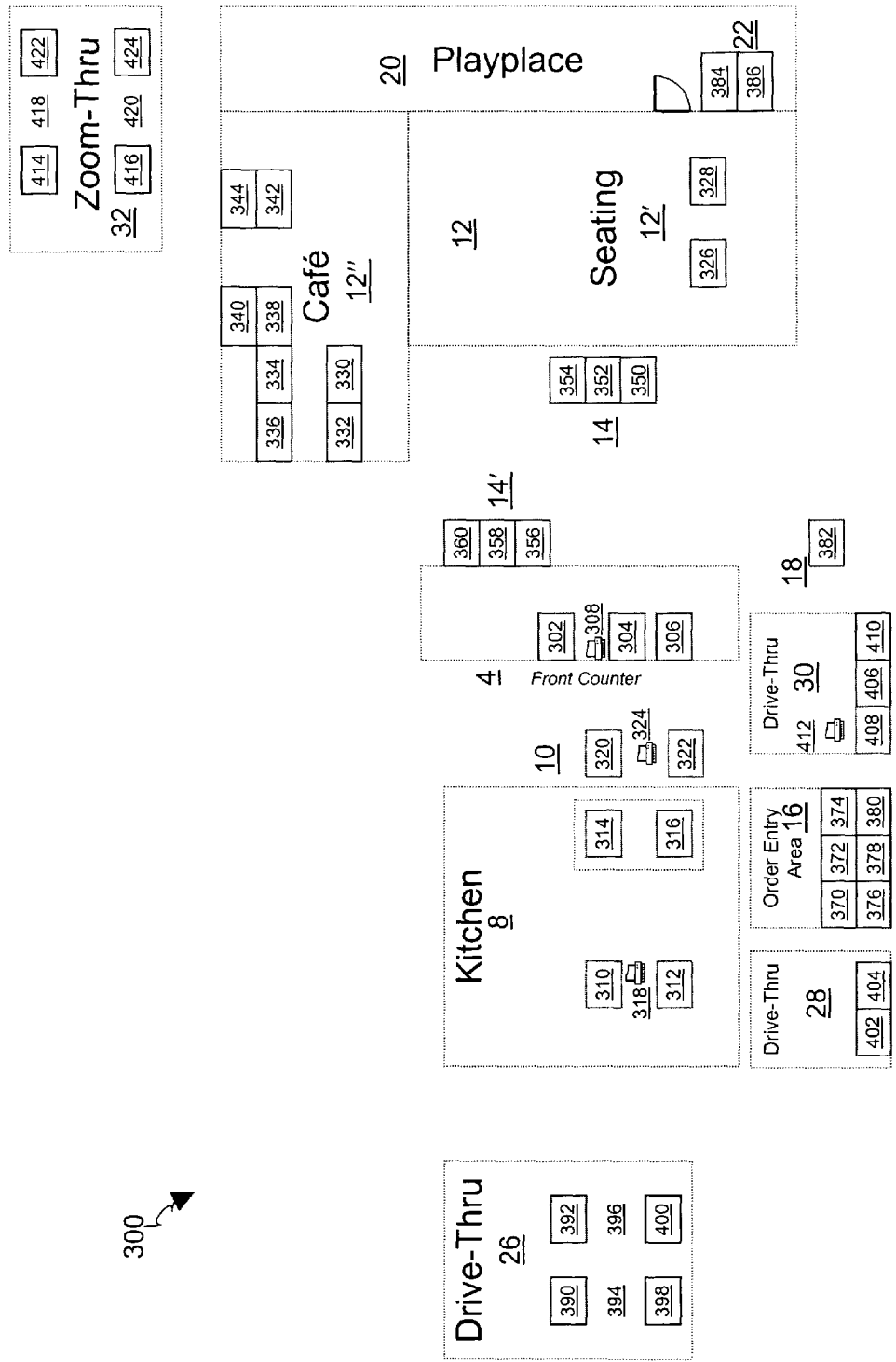
FIG. 11 is another view of the restaurant of FIG. 1.

Referring to FIG. 11, in an example of the physical arrangement of devices in a restaurant, the front counter 4 includes cashier stations 302 and 304 having an order entry capability and an order taker telephone 306. The front counter 4 also includes a printer 308. The kitchen 8 includes kitchen video system monitors 310, 312, 314, and 316 and a printer 318. The landing zone 10 includes expediter monitors 320 and 322 in addition to a printer 324. The seating area 12' includes tables 326 and 328. The café 12" includes tables 330, 332, 334, and 336 having customer telephones 338, 340, 342, and 344, respectively. The telephone tree 14 includes customer telephones 350, 352, and 354. The telephone tree 14' includes customer telephones 356, 358, and 360. The order entry area 16 includes order entry stations 370, 372, and 374 in addition to order taker telephones 376, 378, and 380. The playplace telephone tree 22 includes telephones 384 and 386. The drive-through lanes 26 include speaker/microphones 390 and 392 in addition to drive-through displays 394 and 396. The drive-through lanes 26 also include cameras 398 and 400. The drive-through cashier payment area 28 includes a cashier station 402 with an order entry and order taker telephone 404. The drive-through presenter 30 includes a cashier station 406 with an order entry and expediter monitor 408, and an automatic beverage system 410. The zoom-through area 32 includes cameras 414 and 416, drive-through displays 418 and 420, and speaker/microphones 422 and 424. The cashier stations 302, 304, 382, 402, order entry stations 370, 372, 374, expediter monitors 320, 322, kitchen video system monitors 310, 312, 314, 316, and drive-through displays 394, 396, 418, 420 are linked together using a network 462 (shown in FIG. 12).

Figure 12:
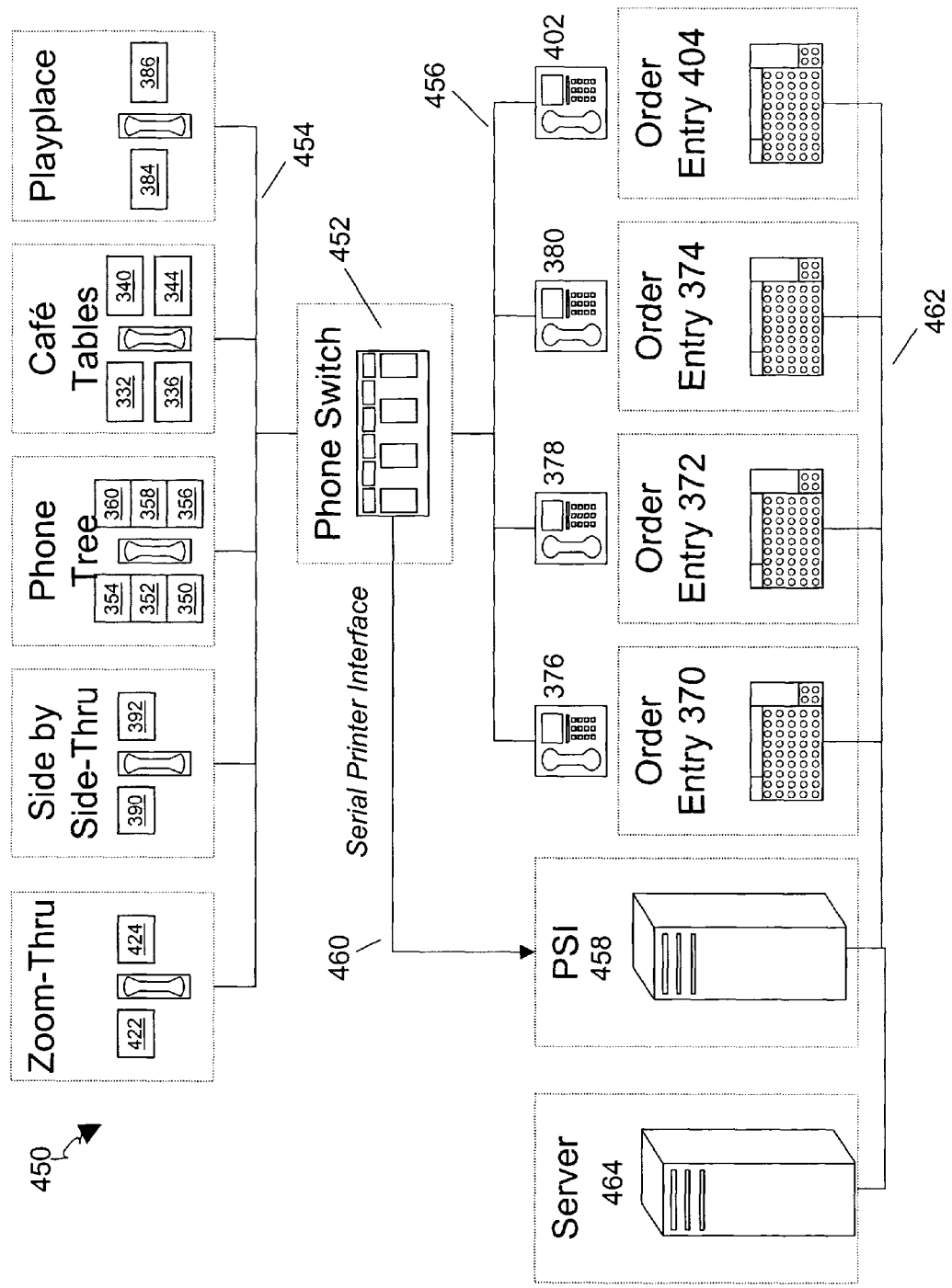
FIG. 12 is a schematic view of the telephone connections for the restaurant of FIG. 1.

Referring to FIG. 12, customer telephones 332, 336, 340, 344, 350, 352, 354, 356, 358, 360, 384, 386, 390, 392, 422, and 424 are connected to order taker telephones 376, 378, 380, and 402 using a telephone switch 452. The telephone lines 454 connect the customer telephones to the telephone switch 452 while the telephone lines 456 connect the phone switch to the order taker telephones. The telephone switch 452 communicates to telephone switch interface 458 the phone extension of a customer telephone from customer telephones 332, 336, 340, 344, 350, 352, 354, 356, 358, 360, 384, 386, 390, 392, 422, and 424 every time an order taker receives an order from a customer using a customer telephone. The telephone switch interface 458 extracts the extension numbers of the calling and receiving phones by scanning data the phone switch 452 writes to its Station Message Detail Recording (SMDR) port. The switch interface 458 is connected to the phone switch 452's SMDR port via a serial RS-232 standard printer interface 460. The restaurant management software running on server 464 receives the telephone extension information, looks the extension information up in a table linking extension numbers with order locations and order entry locations, and furnishes the resulting order point location information to an order entry terminal (from the appropriate order entry stations 370, 372, 374, and 404) with an order entry location matching the order taker's extension. The order entry terminal then adds the order location information to the order record. In some examples, the network 462 is a Transmission Control Protocol/Internet Protocol (TCP/IP) network. The restaurant management software matches this location information to a number designating a table 330, 334, 338, or 342 and communicates this table number with an order record to the database on server 464 using network 462.

In some examples, the restaurant management software can be configured to use the information about the location of the customer placing the order to modify the prices charged for each item in a food order and displayed in interface 100. For instance, prices could be lower for customers ordering food in the drive-through 26 or the zoom-through 32 than for customers in the dining area 12. The software could also adjust other aspects of the order based on the identity of the order point.

In some implementations, the telephones in the restaurant 2 may be replaced by Voice over Internet Protocol (VoIP) enabled computers using a TCP/IP network, with each of the computers having a speaker and a microphone. In these examples, the telephone switch 452 is not necessary and the location of a customer using a VoIP enabled computer is determined by the TCP/IP address of the VoIP enabled computer. Other electronic devices capable of transmitting voice communications between customers and order takers can also be used.

The telephone switch 452 is able to monitor the availability of order taker telephones 376, 378, 380, and 402 and connects customers on the customer telephones 332, 336, 340, 344, 350, 352, 354, 356, 358, 360, 384, 386, 390, 392, 422, and 424 only with available order takers. During surges in business in restaurant 2, there might be more customers on customer telephones than order takers able to take orders. During such surges, customers must be placed on hold until an order taker is available. To handle such situations, the telephone switch 452 can be configured to prioritize the customer telephones based on the classes of the customer telephones that define the context of each customer order. These classes are defined by the locations of the customer telephones and can be matched to different levels or classes of service. In some examples, the highest priority is given to the customer microphones/speakers 422 and 424 for the zoom-through 32, the next priority is given to the customer telephones 390 and 392 for the drive-through 26, the next priority is given to the customer telephones 350, 352, 354, 356, 358, and 360 for the phone trees 14 and 14', the next priority is for the customer telephones 332, 336, 340, and 344 for café 12", and the last priority is for the customer telephones 384 and 386 for the phone tree 22 in the playplace 20. This prioritization reflects the different anticipated needs of customers in restaurant 2 and can be modified. Furthermore, the prioritization can be modified based on the time of day. Based on these considerations, for each customer order, the order is marked with a set priority after the order is entered into the restaurant management software. The marking and prioritization of orders into service classes can be done whether or not there is an overload on available order takers.

For example, assume customers make the following telephone calls in the following time sequence to place orders: order A (from telephone 352 in phone tree 14), order B (from telephone 384 in phone tree 22 in the playplace 20) and order C (from microphone/speaker 422 in zoom-through 32). Assuming only one order taker in area 16, the order taker handles the calls in the following order: order C, order A, and order B. Even if there were enough order takers to handle all calls immediately, the priority information could be associated with each order and used to process the orders in different ways.

In the quick-serve restaurant 2, an order may be placed from the telephone trees 14 or 14' as follows. A customer picks up one of the customer telephones 350, 352, 354, 356, 358, or 360. The telephone switch 452 directs the new call to an available order taker using one of the telephones 376, 378, 380, or 402. The available order taker greets the customer and enters the customer's order using the interface 100 on one of the order entry stations 370, 372, 374, or 404. However, the restaurant management software does not yet add the order items to the production requirements. The order taker asks the customer to take an available numbered table tent. The customer tells the order taker the number on the table tent. The order taker enters the table tent number into the order and tells the customer to proceed to one of the cashier stations 302, 304, or 382. When the customer arrives at the cashier station 302, 304, or 382, the cashier asks for the table tent number and picks the customer's order from the gallery of orders using the user interface 140. The customer may add items to the order and the cashier can enter the items using an order entry station. The cashier accepts a cash payment from the customer and makes change. The restaurant management software is configured to add the contents of the order to the production requirements. Workers in the kitchen 8 process the order. An expeditor in the landing zone 10 assembles the order and delivers the order at the table tent indicating the customer's chosen delivery point.

In another example, in the restaurant 2, to order food from the café 12" or the playplace 12' using a credit card, the customer picks up a telephone from one of the customer telephones 332, 336, 350, 344, 384, or 386. The telephone switch 452 directs the new call to an available order taker on one of the telephones 376, 378, 380, or 402. The order taker greets the customer and requests a payment method. Because the customer wishes to use a credit card for payment, the order taker directs the customer to swipe a credit card in a machine at the customer's table or at the telephone tree 22 and the customer swipes the credit card. The restaurant management software automatically makes a request for approval by the card issuer for a predetermined amount to be charged to the customer's credit card. The order taker enters the customer's order using the interface 100 on one of the order entry stations 370, 372, 374, or 404. If the customer is located at the telephone tree 22, the customer is also directed to choose a table tent as explained earlier. The order taker tells the customer to wait for delivery of the order. In some examples, the restaurant management software can provide a time estimate for the delivery of the food order. In such examples, the order taker can inform the customer of this time estimate. The restaurant management software waits for approval of the credit card. The restaurant management software adds the contents of the order to production requirements. The new production requirements are displayed on the kitchen video system monitors 310, 312, 314, and 316. Workers in the kitchen 8 produce the contents of the order according to these new production requirements. When the order is complete and payment is authorized, an expeditor assembles and delivers the order to the customer at the location from which the customer called (when seated at table 330, 334, 338, or 342) or at which the customer has placed the table tent (at table 326 or 328).

In the restaurant 2, to order food from the café 12" or playplace 12' using cash, the customer indicates to the order taker that the customer intends to pay with cash. After the order taker enters the customer's order, the expeditor (or a cashier) sees an unpaid café or playplace order and prints a guest check using a printer 324 or 308. The expeditor finds the customer based on a table number (indicating a table from 330, 334, 338, or 342) or a table tent number (located on table from 326 or 328) on the receipt and greets the customer. The expeditor accepts a cash payment from the customer and provides any necessary change to the customer. The expeditor returns to a cashier at one of the cashier stations 302, 304, or 382 and pays for the order. The restaurant management software adds the contents of the order to the production requirements. When the order is complete, the expeditor assembles the order in the landing zone 10 and finds the customer based on a table number or a table tent number on the receipt and delivers the food order to the customer.

Figure 13:
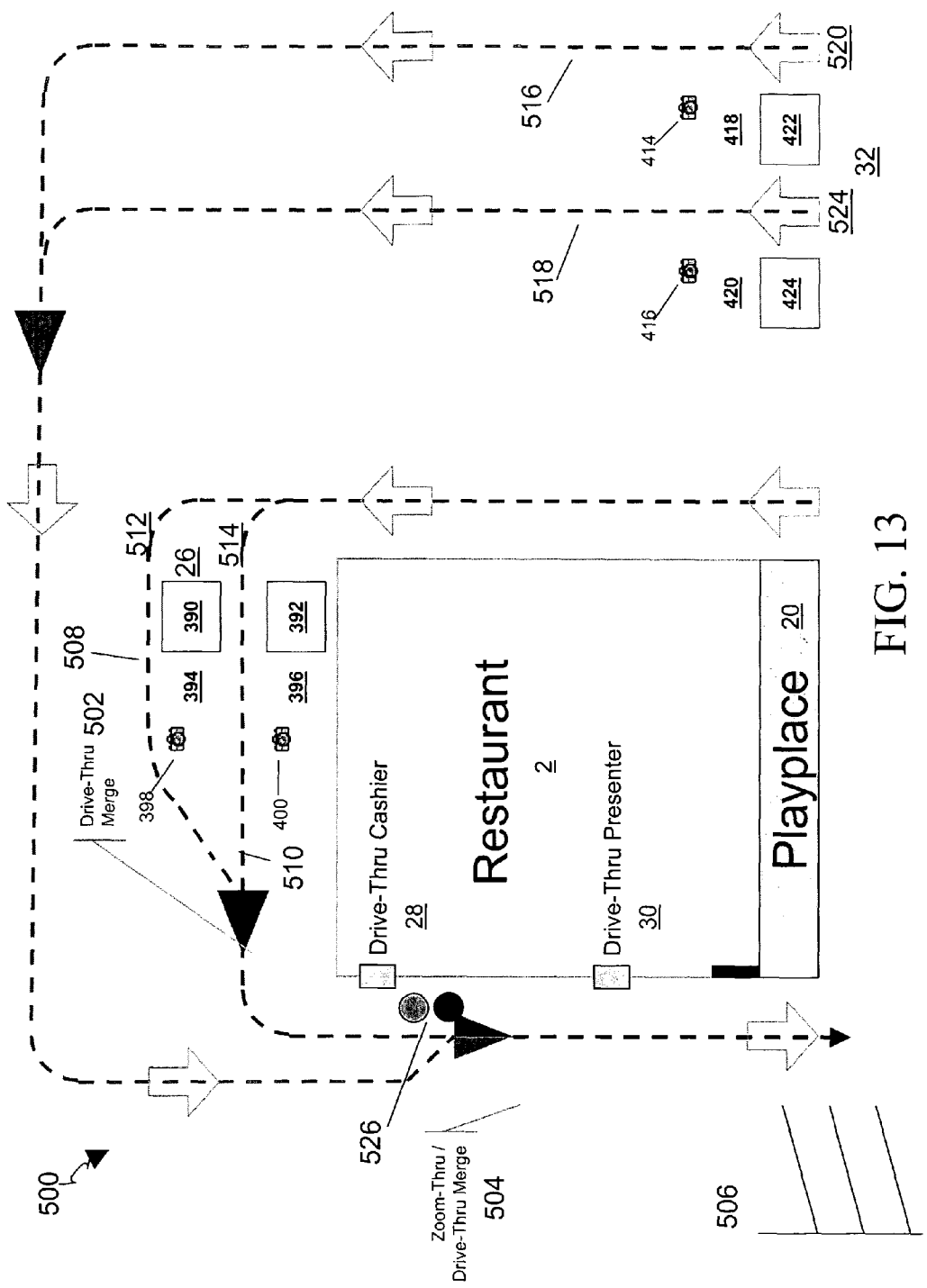
FIG. 13 is a schematic view of the drive through for the restaurant of FIG. 1.

Referring to FIG. 13, the drive-through entrance 26 includes lanes 508 and 510 that merge at a point 502. The zoom-through entrance 32 includes lanes 516 and 518. The drive-through lanes 508 and 510 merge with the lanes 516 and 518 of the zoom-through 32 at a point 504. The restaurant 2 includes a parking lot 506. The drive-through lanes 508 and 510 have sensors 512 and 514 embedded in the pavement that send a signal to the telephone switch 452 when an automobile enters the lanes 508 and 510. The zoom-through lanes 516 and 518 have sensors 520 and 524 embedded in the pavement that send a signal to the telephone switch 452 when an automobile enters the lanes 516 and 518. A stop/go light 526 indicates to customers in the drive-through 26 whether to stop at a cashier window 28 or not. In the restaurant 2, to order food using the drive-through 26, the customer drives up to the drive-through 26 at either lane 508 or 510. The sensor 512 or 514 under the pavement signals the telephone switch 452. The telephone switch 452 sets up a new call for either microphone/speaker 390 or 392 with an order taker at one of the order taker telephones 376, 378, 380, or 402. The order taker greets the customer and requests a payment method. If the customer is not ready, the order taker instructs the customer to signal when the customer is ready and hangs up. The process begins again when the customer calls again. If the customer wishes to use a credit card, the order taker directs the customer to swipe a credit card at a machine located beside the lane 508 or 510. Approval is sought as explained earlier, but the restaurant management software assumes that approval will be granted. The order taker receives the order from the customer and enters the order using the interface 100.

A camera 398 or 400 takes a digital picture of the customer when the order taker enters a first food item of the order. The restaurant management software displays the food items of the order to the customer using the drive-through display 394 or 396. The customer confirms to the order taker that the order is correct. The restaurant management software adds the contents of the order items to the production requirements and the order is produced as explained earlier.

Figure 14:
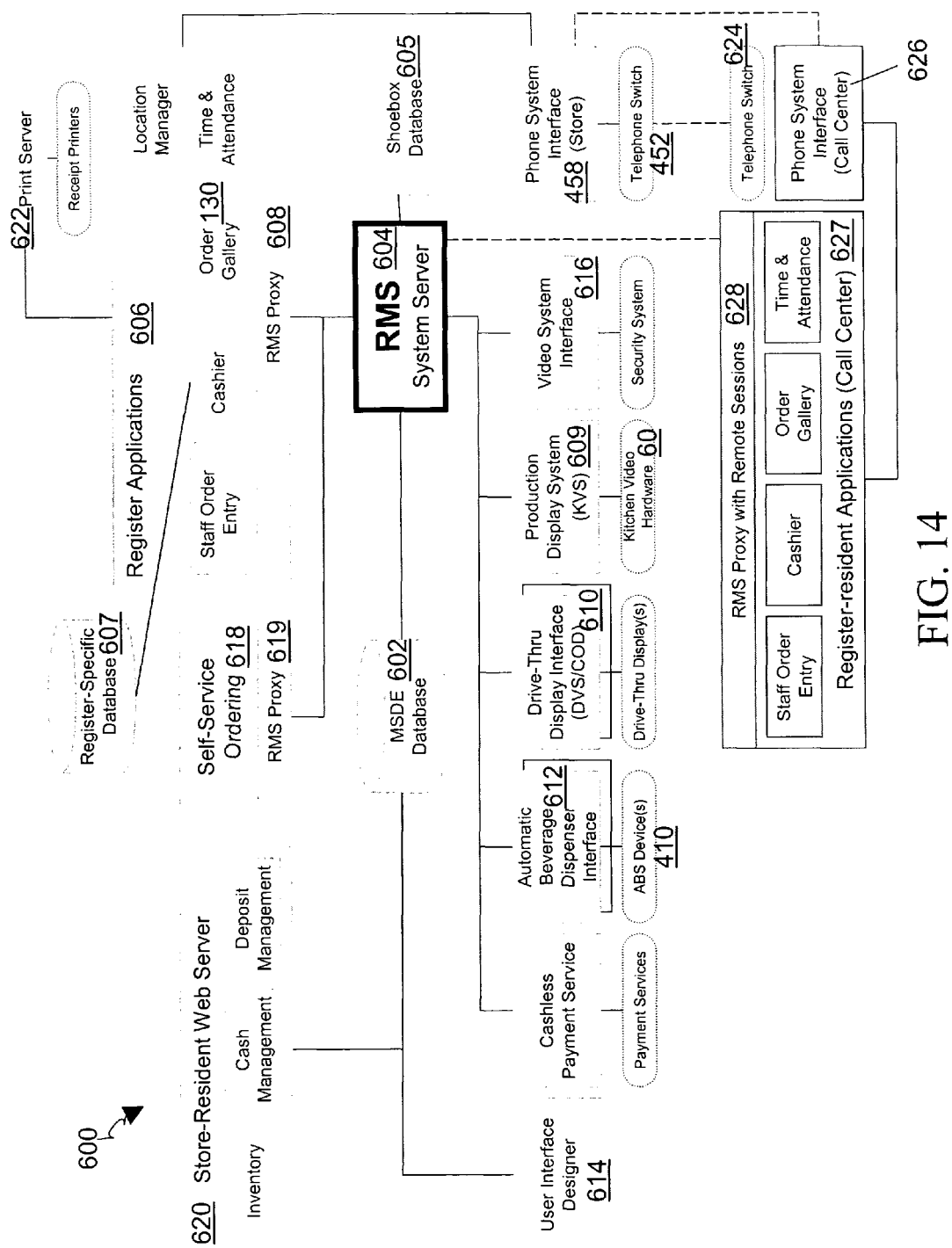
FIG. 14 is a view of the software architecture of restaurant management software.

At the cashier area 28 (the payment point), a cashier uses the digital picture of the customer to match the customer with his order using the interface 150. If the customer has not already paid with a credit card, the restaurant management software flips the stop/go light 526 to "stop", and the cashier accepts cash payment from the customer and makes change. If the customer has already paid with a credit card, the restaurant management software flips the stop/go light 526 to "go". At the delivery window 30, an expeditor uses the digital picture of the customer to match the customer with his order using the interface 150, verifies that the customer has made payment, assembles the order according to the information displayed on the interface 160, and delivers the assembled food order and a receipt to the customer. To order food using the zoom-through entrance 32, the customer drives to the zoom-through entrance 32 at either lane 516 or 518. The sensor 520 or 524 signals the telephone switch 452. The telephone switch 452 sets up a new call as in the earlier example. If the customer wishes to use a credit card, the order taker directs the customer to swipe a credit card at a machine located beside lane 516 or 518. As in the earlier example, the restaurant management software assumes approval will be granted. The order taker receives the order from the customer and enters the order using the interface 100. A camera 414 or 416 takes a digital image of the customer when a first item is added to the order. The restaurant management software displays the contents of the food order using the drive-through display 418 or 420. The customer confirms to the order taker that the order is correct. When ordering is complete, the order taker directs the customer to proceed to merge point 504. The restaurant management software adds the contents of the food items to production requirements. At the delivery window 30, an expeditor views the digital image of the customer to match the customer with a order, verifies that the customer has made payment, assembles the order, and delivers the assembled order and a receipt to the customer. Referring to FIG. 14, the restaurant management software 600 includes a portion that runs on a central server in the restaurant and is called a restaurant management system (RMS) server 604. The server 604 stores restaurant status and order status information for local viewing at registers, stations, terminals, and other devices connected to a local area network. The RMS server 604 tracks the current state of restaurant 2 (for example, open or closed) and also tracks the state of all pending orders at all times and stores this information in a "shoebox" database 605. Since information about pending orders includes a dynamic association of each order with a delivery point, a customer can change his or her mind about the delivery point and a new delivery point can be recorded in database 605 for the order.

Status information to be viewed from or used by other devices or to be archived for later analysis and use are archived in a database 602. In some examples, the computer database 602 is a Structured Query Language (SQL) database, e.g., a Microsoft Data Engine (MSDE) database. In effect, the shoebox database 605 is a redundant storage facility that holds order status information for pending and recent orders and also keeps backup copies of the orders indefinitely. The order information is updated frequently and circulated among the local devices in the restaurant (and also to the call center if one is being used). The database 602, on the other hand, maintains a complete history of orders for a long period of time for later analysis and display.

Each of the cashier stations 302, 304, 382, 402, and 406 has a restaurant management system client application 606 and a database 607. The database 607 stores information about cash and transactions for each cashier station in addition to information about operators at the cashier station. The databases 607 ensure that each of the cashier stations 302, 304, 382, 402, and 406 is capable of running in a standalone mode by operating on stored or cached data if any of the cashier stations become disconnected from network 462. It is essential that records of cash at cashier stations 302, 304, 382, 402, and 406 be maintained even if any cashier stations become disconnected from network 462. This ensures that theft of cash from cashier stations can be detected. The databases 607 maintain such cash records. The register-specific database 607 includes a shoe-box database that is a version of the shoe-box data maintained by the RMS server 604.

The register applications 606 communicate with the phone system interface 458 to identify the phone extensions (and locations) of customer telephones 332, 336, 340, 344, 350, 352, 354, 356, 358, 360, 384, 386, 390, 392, 422, and 424. When an order taker begins entering the customer's order, the register application 606 for the order taker's order entry station queries the phone system interface 458 for the extension of the telephone in restaurant 2 that is currently connected with the order taker's telephone. The phone system interface 458 returns this telephone extension to the register application 606 used by the order taker. The register application 606 then associates the customer's telephone extension with the customer's order. Using this association, the register application 606 can immediately classify a customer order placed over a customer telephone by its order point and in the case of customer orders from café 12", register applications 606 can assign the locations of the telephones 332, 336, 340, 344 to be the delivery points for the orders as a dynamic association.

Since the order taker's register application 606 also easily associates the identity of the order taker with the customer's order, data can be recorded on the order taker's productivity in handling customer orders. This data can be used to improve the productivity of order taking.

The register applications 606 monitor a communication channel ("listen") to the RMS server 604 via RMS proxy server 608 for new pending orders entered by order takers or entered using self-service ordering 618. This enables the register applications 606 to display the latest list of pending orders on interfaces 130.

The interaction between the register applications 606 and other clients with the RMS server 604 is a real-time process. Each client (e.g. register applications 606) of the RMS server 604 has one or more "listeners" that react to transactions sent by the RMS server 604 and received locally by the RMS proxy servers 608. The RMS proxy server 608 notifies its host application (e.g. register applications 606) that a change has occurred via an event when the host application inspects the changed data and updates any internal structures as necessary, which infers updates to the interfaces 130.

The RMS server 604 keeps restaurant system status, receives order updates from the stations 302, 304, 382, 402, 370, 372, and 374, broadcasts order status changes to the stations 302, 304, 382, 402, to the order entry stations 370, 372, 374, to the expeditor monitors 320, 322, and to the kitchen video system monitors 310, 312, 314, 316, updates the database 602 and the shoebox database as required, supports shared cashless payment methods such as credit card payment, and synchronizes the register-specific databases 607 with shoebox database 605. The register applications 606 allow workers in the restaurant 2 to enter orders, accept payment, and mark orders as served. The register applications 606 display active orders, support cash control and basic reporting, support multi-lingual graphical user interfaces 180 on a station-by-station basis, and "listen" to orders from database 602.

A proxy is an intermediary between a client workstation and a main server. It supplies the application programming interface (API) that allows the client application to make use of the services provided by the main server. It implements the client side of the client server protocol. It may also maintain server-related state information and cache the results of frequently needed server queries. The RMS proxy 608 is a proxy for register applications 606 and RMS server 604. Information about customer orders such as the phone extension from phone system interface 458 and the location for an order is passed back and forth through RMS proxy 608 to RMS server 604.

Restaurant 2 uses a Remote Payment Service (RPS) software module to enable customers to pay for orders using credit cards and other payment cards such as debit cards. RPS is another software client of the RMS server 604 and can execute instructions on computer 464. With RPS, credit card reading devices are installed at the order points in dining area 12. The card reading devices can be simple magnetic stripe readers (MSR's) available from Neuron Electronics of Torrance, Calif., or the card reading devices can be payment terminals, such as the Hypercom® 6000, available from Hypercom of Phoenix, Ariz., featuring PIN pads, signature capture, and bit mapped displays that are useful for displaying prompts, order details, and advertising.

The RPS is organized such that the appropriate software driver for each installed terminal is loaded dynamically. For example, restaurant 2 can have one type of terminal inside the restaurant and a different type of terminal (designed for outdoors) at the drive through 26. In one example, a terminal has a software driver that simply reads cards and adds their information to the order. In another example, a terminal can have a software driver that interactively prompts the customer and displays the status of the charge (and possibly also the order).

In one example, the card payment terminals are passive, port powered magnetic stripe readers having a green Light Emitting Diode (LED) that lights up when the reader is ready to read a payment card. These readers can handle credit cards, but not debit cards. To accept debit cards, another example uses a terminal with a reader equipped with a Payment Identifier Number (PIN) keypad.

The RPS accesses the payment terminals via serial communication lines. Restaurant 2 includes a serial port expander system, for example a 32-port Stallion board available from Stallion Technologies of Santa Ana, Calif., to interface computer 464 with serial ports of multiple credit card payment terminals. After a customer begins placing an order with an order taker over the telephone (and the order point has a terminal managed by the RPS), the order appears in the system and the RPS waits for a payment card swipe. In one example, the RPS turns on the green LED to provide visual confirmation to the customer that the card can be swiped. At this point, the order taker will invite the customer to swipe a credit card. After the customer swipes his or her payment card, the LED will go off, and the RPS will add a cashless payment line to the order. When the order is completed, if there is a cashless line present in the order, the RMS will submit a charge against it for settlement by the store's cashless payment processor. If the charge is accepted, then the order is paid, and all that remains is for it to be prepared and delivered (with a receipt). Otherwise, the green LED light comes back on, and the customer can either try paying with another card or pay cash to an expeditor in the restaurant 2 or at the drive-thru window 404.

A production display system 609 displays task-specific views of order status on kitchen video system monitors 310, 312, 314, and 316 and updates order status in response to bump bar input. The production display system 609 supports multiple production lines in the kitchen 8, load balancing, multiple hardware systems, multi-lingual display on a station-by-station basis, and listens for changes to orders by monitoring a communication channel to the RMS server 604. The production display system 609 also can communicate with hardware control units that use bump bars to receive production status from workers in the kitchen 8. Such production status indicates completion of certain food production tasks. Thus, workers in the kitchen 8 communicate to the restaurant management software by pressing bump bar buttons. For example, pressing bump bar buttons can indicate that an order is finished in the kitchen 8 or that the language in interface 180 should be changed or that a full display should be scrolled forward or backward. Bump bar interface devices are available from Logic Controls of New Hyde Park, N.Y., U.S.A.

The production display system 609 contains the logic for business rules that define the production process for a given restaurant brand and a given restaurant. This logic is configurable in the production display system software.

A drive-through display service 610 shows the current customer order on the drive-through displays 394, 396, 418, and 420. The drive-through display service 610 also presents promotional imagery on the display and listens to orders. An automatic beverage dispenser interface 612 interfaces with the automatic beverage service 410 to pour beverages ordered in the drive-through (or from any other configurable source) and listens to orders. A user interface designer 614 allows management to edit the user interface of the register and self-service applications and also saves the specifications in the database 602. In this manner, the user interface designer 614 enables the restaurant management software to be configured for different stores and different brands without having to do a complete redesign. A video system interface 616 uploads digital images from cameras 398, 400, 414, and 416 in coordination with order entry and transmits these images to the RMS system server 602. A self service ordering application 618 handles customer service kiosks 74 that enable customers to enter their own orders. The self service ordering application 618 is a platform for promotions and loyalty programs and can be multi-lingual on a station-by-station basis. A proxy 619 is a proxy between the RMS server 604 and the self-service ordering application 618. A store resident web server 620 enables external managers to view restaurant status information in the database 602 using the interface 190. The store resident web server 620 also allows managers to edit the user interface of the register and self-service applications and also saves the specifications in the database 602. A printer service 622 drives serial printers 308, 324, and 412. The printer service 622 prints receipts or grill slips on demand, may be shared by multiple applications, and respects the language of client application.

Video system interface 616 coordinates with order entry using an order list listener to a server within the video system interface 616. The RMS server 604 informs the order list listener of changes to any active order. The order list listener instructs a digitizer to digitize a customer's picture from a camera when the video system interface 616's server sees an order that should have a customer picture based on the location of the order point (e.g., locations in the drive through 28 or the zoom-through 32), but does not have a picture, is in the entering state, or the time difference between the creation of the order, or the current time is less than a configurable maximum.

Checking if the current time is less than a configurable maximum is intended to avoid the case where for some reason a picture is not taken in a timely fashion, and despite the fact that the order taker is still entering the order, the customer has moved away from the ordering location and has been replaced by the next customer in line.

The RMS Server 604 (along with the RMS Proxy 608 and 619) supports two basic kinds of listeners. An "order listener" is informed when a specific order is changed. An "order list listener" is informed when any order in a particular set of orders is changed. The server portion of the video system interface 616 registers itself as an order list listener for all active orders. When any active order is changed, the RMS server 604 sends a message to all the registered order list listeners. That message is received by the RMS Proxy 608 and 619 and converted into an event using standard Java facilities. The host application (e.g., register applications 606) implements an event handler that encodes each application's reaction to the change.

The register applications 606, the self-service ordering application 618, the automatic beverage dispenser interface 612, the drive-through display interface 610, the production display system 609, and the video system interface send information to and receive information to and from the RMS system server 604. Periodically, the RMS system server 604 updates the database 602 with restaurant status information. The store-resident web server 620 and the user interface designer 614 directly connect with database 602. The store resident web server 620 publishes restaurant status information (including inventory, cash management, and deposit management information) from the database 602 on a secure internet connection.

A Multi-Unit-Management-Interface (MUMI) software application (not shown) provides a centralized point of control for enterprise management of multiple restaurants 2. A restaurant resident MUMI application manages the nuts and bolts of connectivity, including guaranteed message delivery between different components of the restaurant management software for a single restaurant 2. At a higher level, a central MUMI server provides features to manage a set of restaurants 2.

Managers access information about the restaurant 2 using the web server 620 and interfaces 192 and 196. When a manager attempts to connect to the web server 620 from off-site (such as the manager's home or a central corporation office), the connection requires an Internet protocol (IP) address. The IP address associated with the restaurant 2 can dynamically change for a number of reasons. Some restaurants 2 can use DSL (Digital Subscriber Line) for an internet connection. For restaurants 2 using a DSL connection, Internet Service Providers (ISP) have different rules for when IP addresses are assigned. A restaurant 2 may not have an "always on" Internet connection because of the cost or availability in its locale, and the store must dial in to the ISP in order to have connectivity and to be assigned an IP address. Thus, an IP address is required to connect to the restaurant 2, but the IP address may not be known and the restaurant 2 may not even be connected to the Internet.

When a restaurant 2 is connected to the Internet, the restaurant-resident MUMI software periodically contacts the central MUMI server and identifies itself. The central MUMI server records the IP address associated with the restaurant 2. If the IP address changes, the central MUMI server will be informed as a result of the periodic contacts made by the restaurant-resident MUMI software.

When the off-site person (the owner or regional manager, etc.) attempts to connect to the restaurant 2 through the central MUMI server, the central MUMI server checks the last-known IP address for the given restaurant 2 to determine if the restaurant 2 is still available at that IP address. If the restaurant 2 is available at the last known address, the central MUMI software redirects the request to that address, and the off-site person proceeds to login. Otherwise, the central MUMI software connects to the store directly by calling the modem attached to the restaurant 2's server. When and if a connection is established, the central MUMI system directs the restaurant 2's restaurant-resident MUMI software to connect to the Internet. Both sides hang up. The restaurant 2 connects to the Internet using the parameters established for that purpose. When the restaurant 2 connects to the Internet, it then contacts the central MUMI server. The central MUMI server knows there is a pending connection request, and it responds. The central MUMI server checks whether its context information for the restaurant 2 is up to date and downloads current information if changes have been made at the restaurant 2.

In some examples discussed previously, order takers in the area 16 are located in a call center. In these examples, an additional telephone switch 624 is used at the call center.

The call center telephone switch 624 and the restaurant telephone switch 452 are used to connect customers using the customer telephones 332, 336, 350, 344, 384, or 386 to order taker telephones 376, 378, 380, or 402 at the call center. When a customer begins a call to place an order using a telephone in the restaurant 2, the telephone switch 452 waits until a trunk line is available at the call center telephone switch 624 and then routes the call over the available trunk line to the call center telephone switch 624. Similarly to connecting calls to order takers in restaurant 2, telephone switch 452 prioritizes calls during busy times based on extension numbers that are linked to locations in restaurant 2. When the telephone switch 452 successfully connects the call to the trunk line to the call center telephone switch 624, the telephone switch 452 triggers the phone system interface 458 to lookup the extension of the call and convert it to a location point. The phone system interface 458 also updates its internal memory structure to reflect an active call between the customer telephone and the call center. When an order taker is available at the call center, the call center telephone switch 624 switches the call on the trunk line to the available order taker on telephone 376, 378, 380, or 402. When the available order taker answers the call, the phone system interface 626 at the call center 626 identifies the restaurant 2 from which the order is being placed by matching the number of the incoming trunk (obtained from data written by the call center switch 624 to its SMDR printer port) line with a table that links trunk lines to restaurants. Next, the call center switch interface 626 asks the restaurant's switch interface 458 for the specific order point location that is connected to the incoming trunk line (information it has gleaned from restaurant 2 switch's 452 SMDR output). Call center switch interface 626 also determines which extension (and thus which order taker) is now connected to that trunk by examining the call center switch's 624 SMDR output. Then, having assembled complete information about the call, the call center switch interface 626 notifies the call center order taker's register 627 to contact the restaurant's RMS server 604 (via a remote session established through its RMS proxy 628) and to display the appropriate user interface, so that the order taker can enter the customer's order. The call information the call center switch interface 626 supplies to the call center register application 627 includes the same order point information that would be available to an in-restaurant order taker. If the order point does not specify the delivery point (e.g., a phone tree order), the order taker obtains a table tent number verbally from the customer and enters it into the order as the delivery point.

In addition to entering customer orders, register-resident applications 627 also handle functions at the call center such as staff order entry, cashier, order gallery, and time and attendance and are, in effect, the same as the register applications in the registers that are located in the restaurant.

A RMS proxy 628 is used at the call center to connect register-resident applications 627 with RMS server 604. The RMS proxy 628 performs all of the functionality of the RMS proxy 608 except that the RMS proxy 628 is located externally to restaurant 2. Thus, telephone order takers at the call center use the same interface 100 as order takers in restaurant 2 to enter customer orders. Call centers handling multiple restaurants with different RMS system servers 604 use multiple proxies 628 to communicate with the different RMS system servers 604. In this manner, telephone order takers at these call centers can switch between interfaces 100 for different restaurants by using software interfacing with different proxy servers 628. This enables the display of different menus and prices for the different restaurants handled by the telephone order takers. This also enables the different restaurants handled by the call centers to have different brands.

Figure 15:
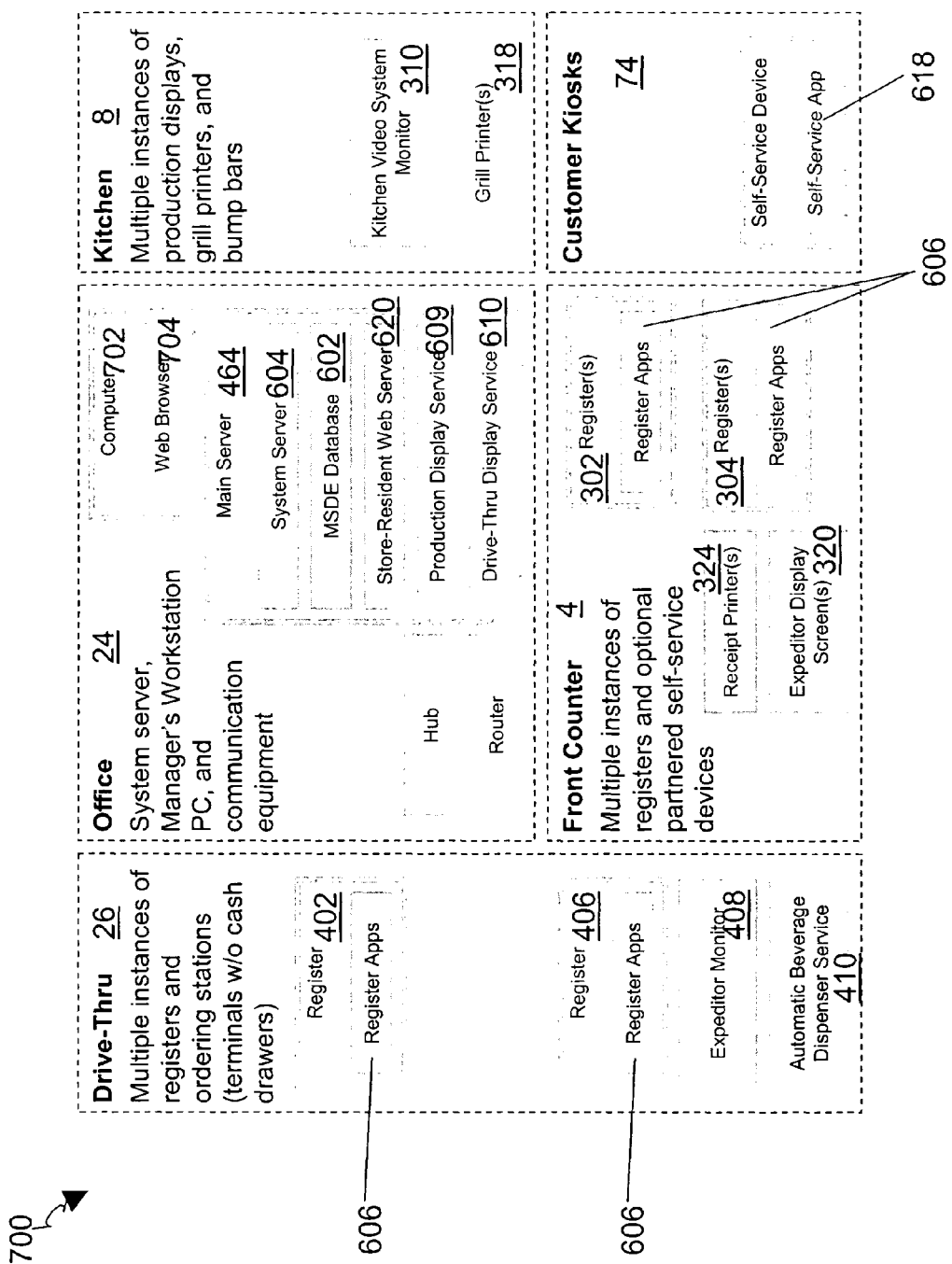
FIG. 15 is a view of an implementation of the restaurant management software of FIG. 14.

Referring to FIG. 15, in some examples, the restaurant management software 600 is executed in five areas: the office 24, the drive-through 26 or 32, the front counter 4, the kitchen 8, and the customer self-service kiosks 74. The restaurant management software 600 includes various components that are executed on different computers. The restaurant management software 600 is not limited to any specific operating system. In some examples, the restaurant management software 600 is implemented in a Java programming language that enables different components of the software 600 to run on different computer platforms and communicate via application programmer interfaces (API). In some examples, these APIs are provided by high level software tools such as Java 2 Platform Enterprise Edition (J2EE) available from Sun Microsystems of Mountain View, Calif. or Microsoft. NET available from Microsoft of Redmont, Wash. In other examples, these APIs are created using a proprietary communication protocol from low level Java code for higher rates of communication. This communication protocol can be created as a software layer above TCP/IP sockets for communication between computers on TCP/IP networks.

In office 24, a main server computer 464 runs the system server software 604, the database 602, the store-resident web server software 620, the production display service 609, and the drive-through display service 610. A computer 702 runs a web browser 704.

In the drive-through area 26, the registers 402 and 406 are computers running the register applications 606 while other computers run software for the expeditor monitors 408 and the automatic beverage dispenser service 410.

In the front counter area 4, the registers 302 and 304 are computers running the register applications 606 while other computers run software for the expeditor monitors 320 and 322. Another computer runs the print server software 622 to print receipts using the printer 324.

In the kitchen area 8, computers run production display system software for the kitchen video display monitors 319, 312, 314, and 316. Another computer runs the print server software 622 to print custom food instructions on printer 318.

For customer kiosks 74, the computers run self-service ordering software 618.

Figure 16:
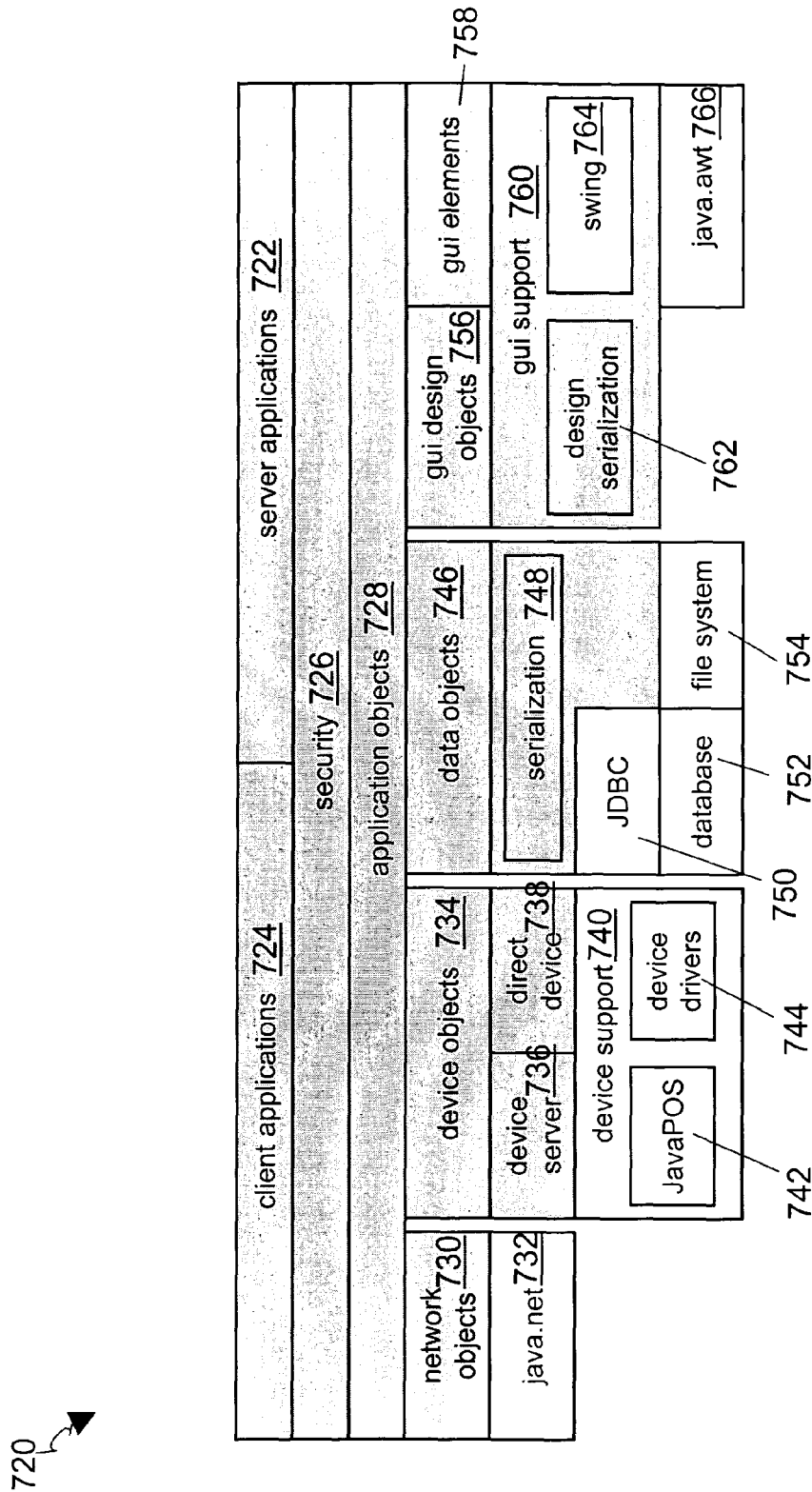
FIG. 16 is a schematic view of software system objects of the restaurant management software of FIG. 14.

Referring to FIG. 16, a view 720 represents the organization of applications and object classes for the restaurant management software. At the highest level, view 720 includes server applications 722 that include RMS server 604. View 720 also includes client applications 724 that include register applications 606, self-service ordering 618, automatic beverage dispenser interface 612, drive-through display interface 610, production display system 608, video system interface 616, and register resident applications (call center) 627. The server applications 722 and the client applications 724 include a security layer 726 and application objects 728. The application objects include logic specific to restaurant management, for example, the definition of management measures such as "Gross Revenue" vary by organization and so they are defined in objects that can be replaced or customized as needed. Beneath the application objects 728 are network objects 730 that utilize the java.net 732 classes. Java.net 732 is a package that provides the classes for implementing networking applications. Java.net 732 is available from Sun Microsystems of Mountain View, Calif., as part of the standard Java software distribution. Beneath the application objects 728 are hardware independent device objects 734. The device objects 734 contain logic for interacting with devices such as bump bars and video display devices in a hardware independent manner. Thus, the device objects 734 should not have to be modified to control bump bars from vendor "B" instead of vendor "A". Device objects 734 include device servers 736 and direct device 738. Device servers 736 provide access to a shared device through a device-independent API in restaurant 2. Direct device drivers 738 also provide dedicated access to a device through a device-independent API, but these devices can not be shared, and the interface is often embedded in a host application that uses the device as a requirement of its business function. Device servers use device drivers to control the devices to which they provide shared access. The device servers 736 and the direct device 738 employ device support software 740 that includes JavaPOS 742 and device drivers 744. JavaPOS 742 is a retail industry standard for a point-of-sale I/O device communication that supports pure Java applications and leverages the OPOS standard. JavaPOS is available from the JavaPOS organization (http://www.javapos.org). The device drivers 744 each control a particular type of device such as a magnetic stripe reader or coin dispenser in restaurant 2. Typically, device drivers 744 are either supplied by the vendor of a device or are written to translate application actions to and from the serial protocol published by the device's vendor. The data objects 746 hold data describing the state of the restaurant 2, orders, and inventory. The data objects 746 include server proxies 608, 619, and 628 that insulate applications from server application failures. The RMS server 604 uses data objects 746 to store data in shoebox database 605 and database 602. The register applications 606 use data objects 746 to store data in register-specific databases 607. The serialization objects 748 contain methods for converting data objects 746 into serial streams for storing data objects 746 into databases. JDBC 750 is the Java Database Connectivity API (Application Program Interface). JDBC 750 is a programming interface that allows Java applications to access SQL database servers in a standard way. JDBC 750 allows the integration of Structured Query Language (SQL) calls into a Java programming environment by providing library routines that interface with the database. It provides functionality for Java that is similar to what Open Database Connectivity (ODBC) provides for older programming languages. JDBC 750 is available from Sun Microsystems of Mountain View, Calif. ODBC is available from Microsoft Corporation of Redmond, Wash. Database 752 includes shoebox database 605 and database 602. A file system 754 is a file system for the operating system of main server 464. Graphical User Interface (GUI) design objects 756 implement the logic for user interface designer 614. GUI elements 758 are a library of elements useful for creating GUIs for client applications 724. GUI support classes 760 include design serialization classes 762 and Java Swing classes 764. Java Swing classes 764 enable the creation of GUIs for Java applications and applets using a set of components and are available from Sun Microsystems of Mountain View, Calif. Package java.awt 766 contains additional classes for creating user interfaces and for painting graphics and images.

One class of object among data objects 746 is the order class. An instance of the order class contains information about an order that has been initiated in the restaurant. The instance of the order includes a hierarchical list of lines, each of which reflects a line in the contents 134 of the interface 130 displaying orders. The base class of all order lines is OrderLine. Each line is represented by an instance of an appropriate subclass of OrderLine.

Different subtypes of OrderLine contain different data. For example, an ItemLine might indicate that a certain quantity of a certain menu item (e.g., a hamburger) is part of the order. An OptionLine may add the fact that a particular modification (e.g., no salt) applies to one of the items being ordered. Other subclasses may record the fact that a coupon, discount, or voucher has been applied to the order or to one of the items in it.

Some types of line, namely those extended from OrderLineContainer, may contain sublines, which are lines nested within, or owned by, the line.

Figure 17:
FIG. 17 is a table with data describing an order.

Referring to FIG. 17, a table 800 is an example of an object-oriented data structure for an order. A class column 802 denotes the class name of each object representing food items or options in the order. A guest check column 804 denotes food items or options in the order. A level column 806 denotes the nesting level of the line objects (the level is not actually stored in the order, but simply depicts the nesting depth). The order as whole is represented by an instance of the Order class 808, at level #0. The order's direct sublines are the lines at level #1. The order's direct and indirect sublines are all the lines in the order. At level #1, is a Big Mac item 810, which owns two options, no onions 812 and extra mustard 814, nested at level #2. Following the Big Mac item 810 is the Extra Value Meal item 816, which has quarter pounder component 818, fries component 820, and coke component 822, at level #2. The quarter pounder component 818 owns option side pickles 824 at level #3 and fries component 820 owns option no salt 826.

Orders in the database 605 are updated by the RMS server 604 as register applications 606, self service ordering 618, and register-resident applications 627 receive orders entered at restaurant 2. Orders in database 605 are read-only to client applications. When RMS server 604 finishes updating an order, RMS server 604 broadcasts the new version of the order to applications such as register applications 606, self service ordering 618, and register-resident applications 627.

The RMS server 604 updates an order as follows. A register application (e.g.,., the register application 606, the self service ordering 618, or the register-resident application 627) receives an OrderEvent notification from the order object. The RMS server 604 obtains an OrderUpdate object from the newOrderUpdate method of the Order object. The RMS server 604 application specifies the changes to be made to the order by invoking appropriate methods of the OrderUpdate object. The RMS server 604 invokes the OrderUpdate object's submit method. The RMS server 604 receives the OrderEvent when the update is complete. The OrderEvent contains a new copy of the Order object. The RMS server 604 updates the display model and rebuilds the display.

Whenever an OrderUpdate object applies itself to an order, the OrderUpdate object stamps the Order object with the current time, a station (e.g., order entry station 370, 372, and 374) that issued the update, and the worker using the station. Any actions specified as part of the same OrderUpdate, for which a time stamp is noted, will receive the same timestamp.

An order may be delivered in one of three service modes: EAT_IN, TAKE_OUT, and DRIVE_THRU. The service mode is entered with the order and is part of the data for an order object.

During the lifetime of an order object, the order passes through a number of states. At key state changes, the order update process notes the order's age, the worker (or customer using a self-service kiosk) who entered the change, and the order entry station from which the state change was initiated. The order object uses the recorded times to compute several time intervals which are significant to the management of the restaurant.

An order may exist in the following states: inactive, active, entering, entered, paying, paid, parked, served, held, and canceled. An order starts out in the inactive state. An order belonging to an idle station may be reside in the inactive state indefinitely. An order becomes active when the first update is posted against it. When it becomes active, an order's age is reset to zero, and it automatically enters the entering state. An order is in the entering state while a worker (or the customer) is entering items. When an order first becomes active, it goes into the entering state automatically.

An order leaves the entering state and becomes entered when the user finishes entering its contents. An order is in the paying state while the cashier collects the amount due from the customer. An order becomes paid when the cashier concludes the payment process by shutting the cash drawer. To keep the drive-thru line 26 moving, the RMS server 604 may on occasion direct a customer to park off to the side pending delayed delivery of the order. When this occurs, the order is in the parked state. An order becomes served when the food is handed to the customer. During order entry, a crew member can place an order in the held state to notify the kitchen staff to pause its preparation pending a customer decision. The order object tracks time spent in held status. An order becomes canceled if it is not to be produced after all.

The Order object tracks the following time intervals, which are crucial to measuring restaurant performance. All times are returned as floating point values in seconds. They are maintained internally with a precision that allows measurement to the nearest 0.1 second. Entry time is the total time spent entering the contents of the order into the system. Line time is the interval between the conclusion of the order entry process and the start of the payment process. For drive-thru customers, line time is the interval spent in line after giving the order at the intercom and before reaching the window. For in-store customers, line time is zero. Payment time is the time spent collecting the amount due from the customer for the order. The beginning of payment time is when the payment interface is presented to the cashier. The end of payment is when the cash drawer is closed. Delivery time is the interval extending from the end of the payment process until the order is either served or parked. Parked time is the interval, if any, extending from the time the order was parked until it is served. Held time is the total time during which the order was in held status. Elapsed time is the total time to process the order. Elapsed time extends from the time the order first becomes active until it is served.

Normally, the Order object is used to specify a list of food items to be prepared and served to a customer in return for payment. However, occasionally, a customer is due compensation for unsatisfactory food. In such cases, the restaurant needs to note which items were unacceptable, calculate their value, and possibly prepare replacements. To facilitate and account for this process, an order may take on the following attributes: An order is flagged as a refund if the price of the order is to be paid back to the customer. An order has the replacement attribute if it is to be prepared and served.

Certain types of changes to an order are considered voids. An excessive number of voids may call for employee supervision, which the RMS server 604 enforces by requiring a "manager swipe" before making the desired change to the order. Order can record the number of voids and their total value.

Although some examples and implementations have been described, a wide variety of other examples are also within the scope of the following claims.

For example, the customer telephones 332, 336, 350, 344, 384, or 386 and order taker telephones 376, 378, 380, or 402 may be replaced with Voice over Internet Protocol (VoIP) enabled computers using the network 462 and speakers and microphones. In these examples, the telephone switches 452 and 622 are not necessary and the location of a customer using a VoIP enabled computer is determined by the address of the VoIP enabled computer. In examples where network 462 is a TCP/IP network, the address is identified by a TCP/IP address on network 462.

The discussion has focused on quick-serve restaurants but the techniques described are applicable to other types of restaurants, other types of quick-serve retail businesses, other types of non-quick-serve retail businesses, and other types of non-retail businesses. As one example, the techniques are also applicable to the food service component of convenience stores that also provide gasoline to automobiles. The items to be included in the orders need not be food items and need not be items that are prepared to order or on the premises where they are to be delivered.

Although many of the techniques described involve wired devices, they may also be applied using wireless devices, including wireless telephones, personal assistants, and other wireless devices.

The customers need not be physically present on the premises to order. They may place orders from other locations, for example, from a desktop computer at home or work or from a device such as a mobile phone while traveling in the vicinity of the place where delivery of the order is to occur.

Although in some examples a digital picture is used to identify the customer, it would be possible to use other features, such as the color or model of the automobile being driven by the customer.

What is claimed is:

1. A method comprising
receiving essentially simultaneously orders for restaurant food items from two or more different patrons with respect to two or more different restaurants at which the patrons are located and at which ordered food items are to be delivered to the respective patrons, and
balancing the load of the ordering process by
   (a) receiving the orders telephonically at a call center,
   (b) at the call center, displaying information for use in connection with one of the orders associated with one of the restaurants, the information relating to a set of food items available at the one restaurant,
   (c) at the call center, displaying information for use in connection with another one of the orders associated with another one of the restaurants, the information relating to a set of food items available at the other restaurant, and
   (d) while the orders are being received at the call center, providing information about the orders electronically from the call center to an order processing system that performs order entry and/or order processing functions at the one restaurant and the other restaurant.

2. The method of claim 1 in which the orders are received from at least some of the patrons from locations other than the locations of the restaurants at which the food items are to be delivered.

3. The method of claim 1 in which, at the restaurants, the food items to be delivered are delivered at points different from the points at which the the information about the orders is electronically received from the call center.

4. The method of claim 1 also including
automatically inferring a class of service for each of the orders based on the location from which the order is placed.

5. The method of claim 4 in which the class of service includes the urgency with which the food items are to be delivered.

6. The method of claim 1 in which the one restaurant and the other restaurant are located in two different time zones and the volume of received orders from the two time zones varies in a predictable way during a 24-hour period.

7. The method of claim 1 in which menus of the food items available at the different restaurants differ and the different menus are available at the call center.

8. The method of claim 1 in which the different restaurants are associated with different brands.

9. The method of claim 1 in which the different restaurants are located in different states or territories.

10. The method of claim 1 in which at least some of the restaurants comprise quick-serve restaurants.

11. The method of claim 1 in which the order processing system includes point-of-sale order entry.

12. The method of claim 1 in which orders received at the call center with respect to at least two of the different restaurants are received by a single call agent.

13. The method of claim 1 in which the information displayed at the call center includes prices of food items, and the price of a given food item is different for the one restaurant and the other restaurant.

14. The method of claim 1 in which the information about orders is sent to the restaurants essentially immediately as the orders are received.

15. The method of claim 1 in which at least one of the orders is received from a mobile phone used by the patron.

16. The method of claim 1 in which at least one of the orders is received from a desktop computer used by the patron.

17. The method of claim 1 in which at least one of the orders is received from a device tat is not owned or controlled by one of the restaurants.

18. The method of claim 1 in which at least one of the orders is received from a telephone at a table in one of the restaurants.

19. The method of claim 1 in which payments for at least some of the orders are received at the call center.

20. The method of claim 1 in which the call center is located in or adjacent to one of the restaurants.

21. The method of claim 1 also including determining a location within one of the restaurants from which an order of a patron is being received and providing the location to the call center.

22. The method of claim 1 also including automatically determining at the call center which one of the restaurants is associated with an order and automatically entering the order information for that restaurant into an order entry system at that restaurant.

23. The method of claim 1 in which a service gallery of pending orders that is displayed to workers in one of the restaurants is also displayed at the call center.

24. The method of claim 1 in which an agent at the call center can select with which restaurant the provided information is associated.

25. The method of claim 1 in which the received orders include multiple simultaneous orders with respect to one of the restaurants.

26. The method of claim 1 in which the received orders include multiple simultaneous orders with respect to more than one of the restaurants.

27. The method of claim 1 in which the received orders include multiple simultaneous orders with respect to restaurants of more than one brand.

28. The method of claim 1 in which the received orders include multiple simultaneous orders with respect to restaurants in more than one time zone.

* * * * *